United States Patent
Kawasaki et al.

(10) Patent No.: US 11,675,547 B2
(45) Date of Patent: Jun. 13, 2023

(54) INFORMATION PROCESSING SYSTEM, POSITION MANAGEMENT METHOD, INFORMATION PROCESSING APPARATUS, AND STORAGE MEDIUM

(71) Applicants: Hajime Kawasaki, Chiba (JP); Makoto Aoki, Tokyo (JP)

(72) Inventors: Hajime Kawasaki, Chiba (JP); Makoto Aoki, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/695,850

(22) Filed: Mar. 16, 2022

(65) Prior Publication Data
US 2022/0300217 A1    Sep. 22, 2022

(30) Foreign Application Priority Data
Mar. 19, 2021    (JP) .............................. JP2021-046491

(51) Int. Cl.
*G06F 3/12* (2006.01)

(52) U.S. Cl.
CPC .......... *G06F 3/1205* (2013.01); *G06F 3/1208* (2013.01); *G06F 3/1242* (2013.01); *G06F 3/1273* (2013.01)

(58) Field of Classification Search
CPC .... G06F 3/1205; G06F 3/1208; G06F 3/1242; G06F 3/1273; G06F 3/1226;
(Continued)

(56) References Cited

U.S. PATENT DOCUMENTS

2003/0127518 A1*  7/2003  Park ..................... G06K 7/14
                                                    235/462.25
2008/0245871 A1*  10/2008  Sato .................... G06K 7/1465
                                                    235/462.12
(Continued)

FOREIGN PATENT DOCUMENTS

EP    2372627 A2    10/2011
JP    2017-199306   11/2017
(Continued)

OTHER PUBLICATIONS

Extended European Search Report dated Sep. 12, 2022, in corresponding European Patent Application No. 22162177.4, 8 pages.

*Primary Examiner* — John R Wallace
(74) *Attorney, Agent, or Firm* — Xsensus LLP

(57) ABSTRACT

An information processing system includes an image capturing device, an information processing apparatus, and processing circuitry. The image capturing device is installed to capture an image of a range in which a position of an object to be managed is managed. The information processing apparatus recognizes a code image corresponding to the object from a captured image captured by the image capturing device and manage the position of the object. The processing circuitry generates spatial coordinate information of the code image based on a position of the code image recognized from the captured image, a size of the code image recognized from the captured image, and a size of a reference code image, and manages the position of the object corresponding to the code image, with plane coordinate information of the code image corrected using the spatial coordinate information of the code image.

8 Claims, 25 Drawing Sheets

(58) Field of Classification Search
CPC . G06F 3/1259; G06F 3/1203; G06V 2201/06; Y02P 90/30; H04L 67/52; H04W 4/021
See application file for complete search history.

(56) References Cited

U.S. PATENT DOCUMENTS

| | | | |
|---|---|---|---|
| 2012/0320406 A1* | 12/2012 | Giannetti | G06Q 10/103 358/1.15 |
| 2013/0057684 A1* | 3/2013 | Iwai | H04N 7/15 348/143 |
| 2015/0062640 A1 | 3/2015 | Shigenobu | |
| 2017/0184698 A1* | 6/2017 | Rueth | G09G 3/006 |
| 2017/0277989 A1* | 9/2017 | Zhou | G06K 7/1447 |
| 2020/0034592 A1 | 1/2020 | Kawasaki et al. | |
| 2020/0293239 A1 | 9/2020 | Kawasaki et al. | |
| 2021/0132874 A1 | 5/2021 | Kawasaki et al. | |
| 2021/0240957 A1 | 8/2021 | Kawasaki et al. | |
| 2021/0294548 A1 | 9/2021 | Kawasaki et al. | |
| 2021/0297553 A1 | 9/2021 | Kawasaki et al. | |

FOREIGN PATENT DOCUMENTS

| | | |
|---|---|---|
| JP | 2020-021181 | 2/2020 |
| JP | 2020-022014 | 2/2020 |
| JP | 2020-024658 | 2/2020 |
| JP | 2020-155118 | 9/2020 |
| JP | 2021-149342 | 9/2021 |
| JP | 2021-149343 | 9/2021 |
| JP | 2021-149945 | 9/2021 |

\* cited by examiner

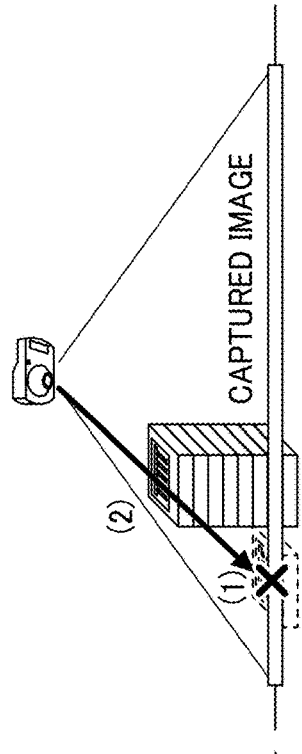
FIG. 5B
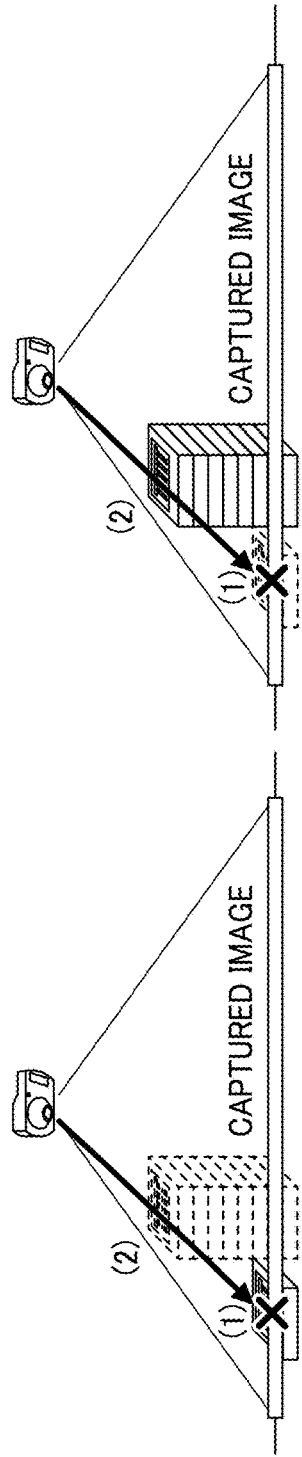
FIG. 5A
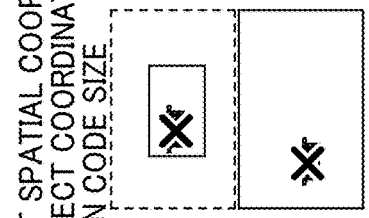
FIG. 6C
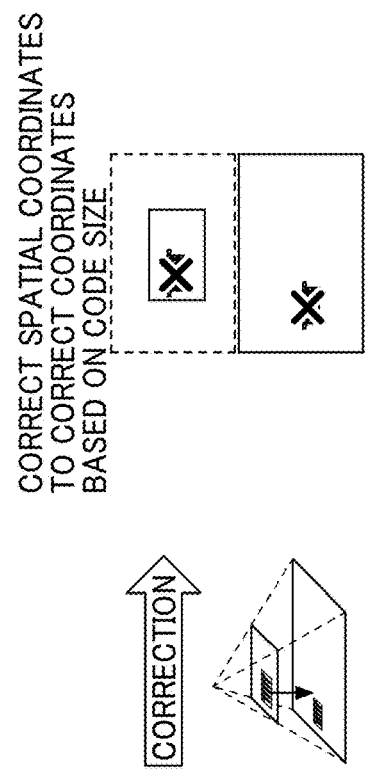
FIG. 6B
FIG. 6A
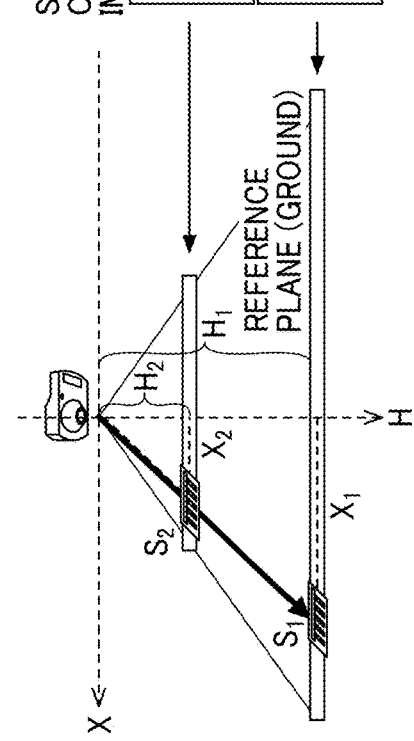

FIG. 11

| ADDRESS SETTING INFORMATION | | | |
|---|---|---|---|
| CAMERA IDENTIFICATION INFORMATION | ADDRESS IDENTIFICATION INFORMATION | REGION OF DIVIDED IMAGE IN CAPTURED IMAGE | JOB PROCESS INFORMATION |
| CAMERA A | ADDRESS (1) | (x,y) = (0,0) – (50,50) UPPER LEFT OF CAPTURED IMAGE | PROCESS A |
| CAMERA A | ADDRESS (2) | (x,y) = (50,0) – (100,50) UPPER RIGHT OF CAPTURED IMAGE | PROCESS A |
| CAMERA A | ADDRESS (4) | (x,y) = (0,50) – (50,100) LOWER LEFT OF CAPTURED IMAGE | PROCESS A |
| CAMERA A | ADDRESS (5) | (x,y) = (50,50) – (100,100) LOWER RIGHT OF CAPTURED IMAGE | PROCESS A |
| CAMERA B | ADDRESS (2) | (x,y) = (0,0) – (50,50) UPPER LEFT OF CAPTURED IMAGE | PROCESS A |
| CAMERA B | ADDRESS (3) | (x,y) = (50,0) – (100,50) UPPER RIGHT OF CAPTURED IMAGE | PROCESS A |
| CAMERA B | ADDRESS (5) | (x,y) = (0,50) – (50,100) LOWER LEFT OF CAPTURED IMAGE | PROCESS A |
| CAMERA B | ADDRESS (6) | (x,y) = (50,50) – (100,100) LOWER RIGHT OF CAPTURED IMAGE | PROCESS A |
| CAMERA C | ADDRESS (4) | (x,y) = (0,0) – (50,50) UPPER LEFT OF CAPTURED IMAGE | PROCESS A |
| ... | ... | ... | ... |

FIG. 12

CAMERA SETTING INFORMATION

| CAMERA IDENTIFICATION INFORMATION | REFERENCE CODE SIZE PLACED ON CENTER OF REFERENCE PLANE | CAMERA HEIGHT |
|---|---|---|
| CAMERA A | 100 | 4 m |
| CAMERA B | 100 | 4 m |
| ... | ... | ... |
| CAMERA KK | 80 | 5 m |
| ... | ... | ... |

FIG. 14

| ADDRESS IDENTIFICATION INFORMATION | JOB PROCESS INFORMATION | STATUS |
|---|---|---|
| ADDRESS (1) | PROCESS A | |
| ADDRESS (2) | PROCESS A | |
| ADDRESS (3) | PROCESS A | |
| ADDRESS (4) | PROCESS A | |
| ADDRESS (5) | PROCESS A | JOB X |
| ADDRESS (6) | PROCESS A | |
| ADDRESS (7) | PROCESS A | |
| ADDRESS (8) | PROCESS A | |
| ADDRESS (9) | PROCESS A | |
| ADDRESS (10) | PROCESS B | |
| ADDRESS (11) | PROCESS B | |
| ADDRESS (12) | PROCESS B | |
| ... | ... | ... |

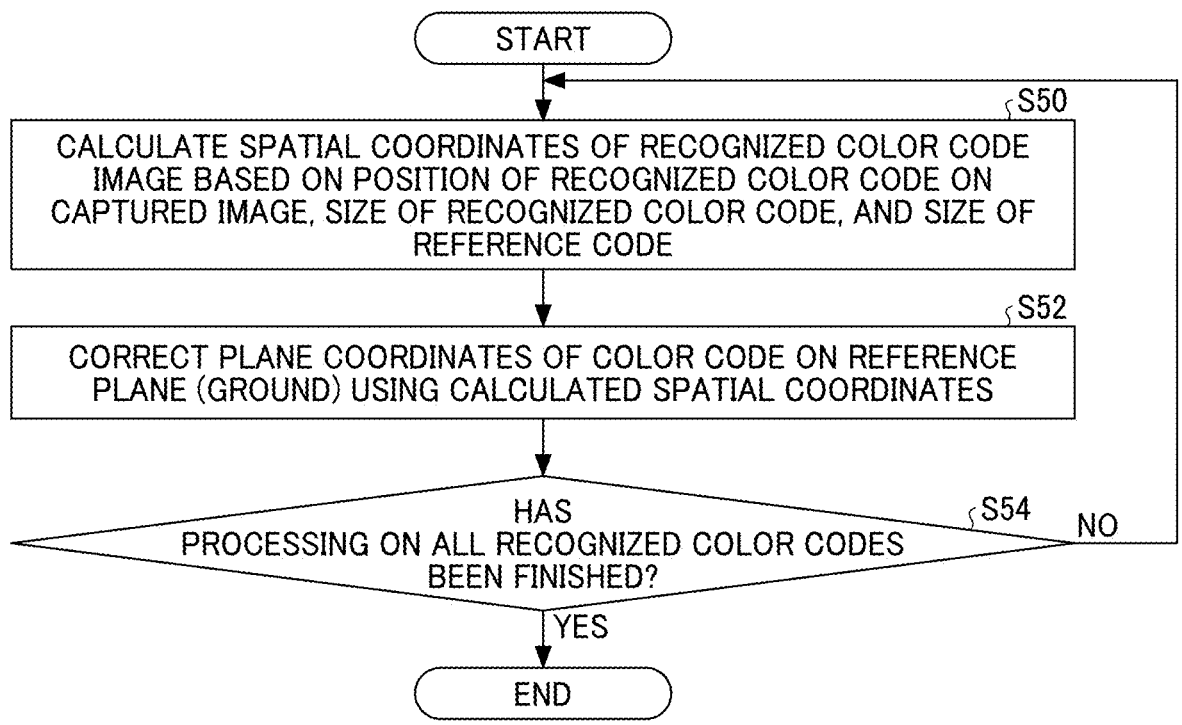

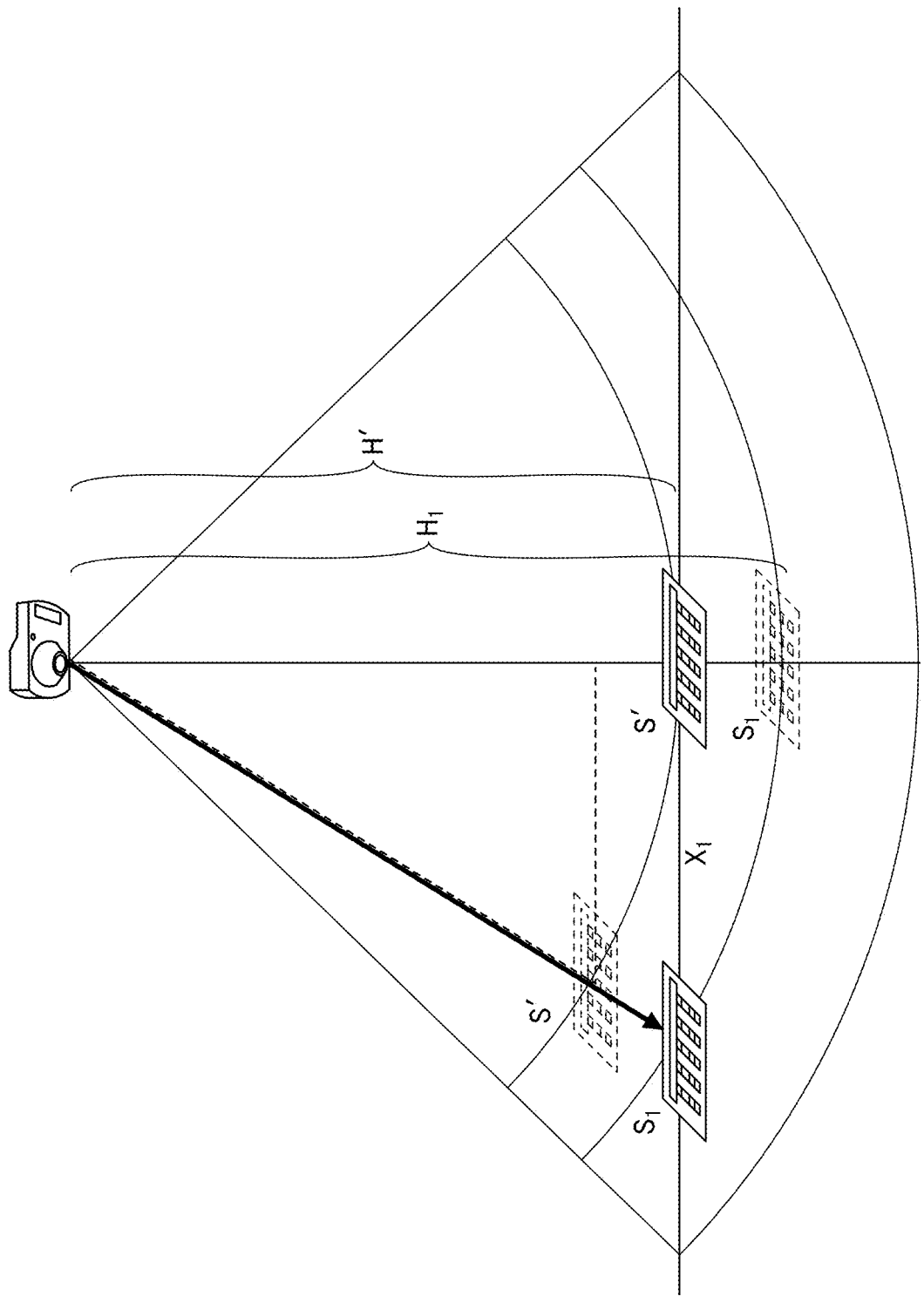

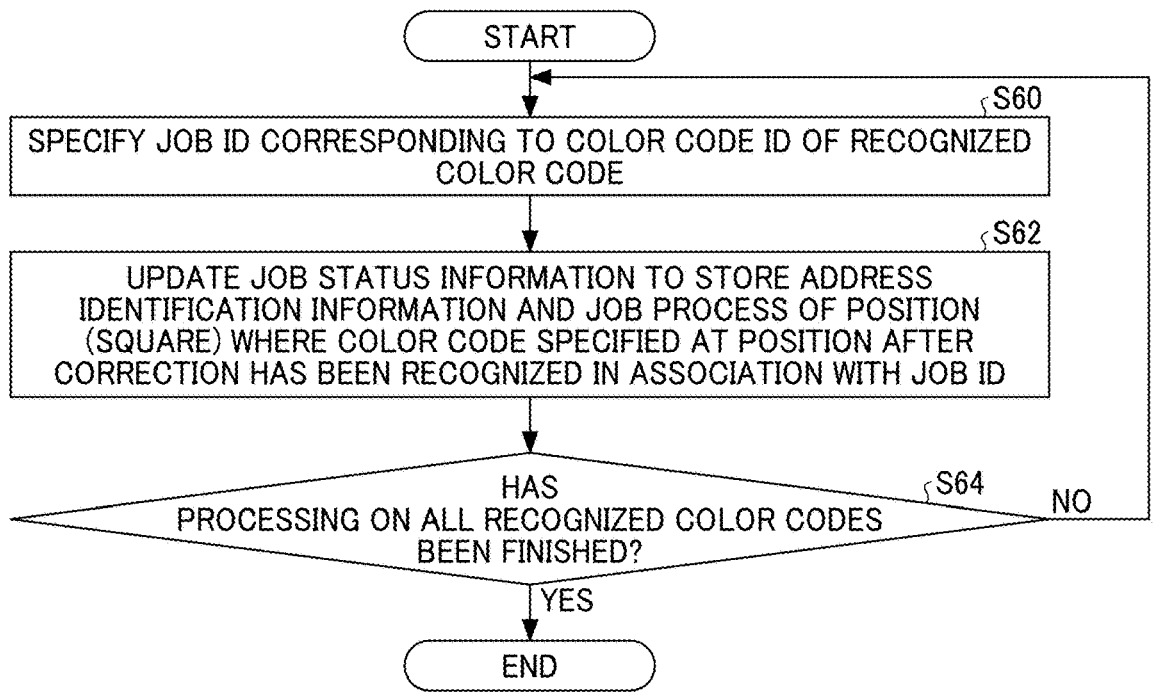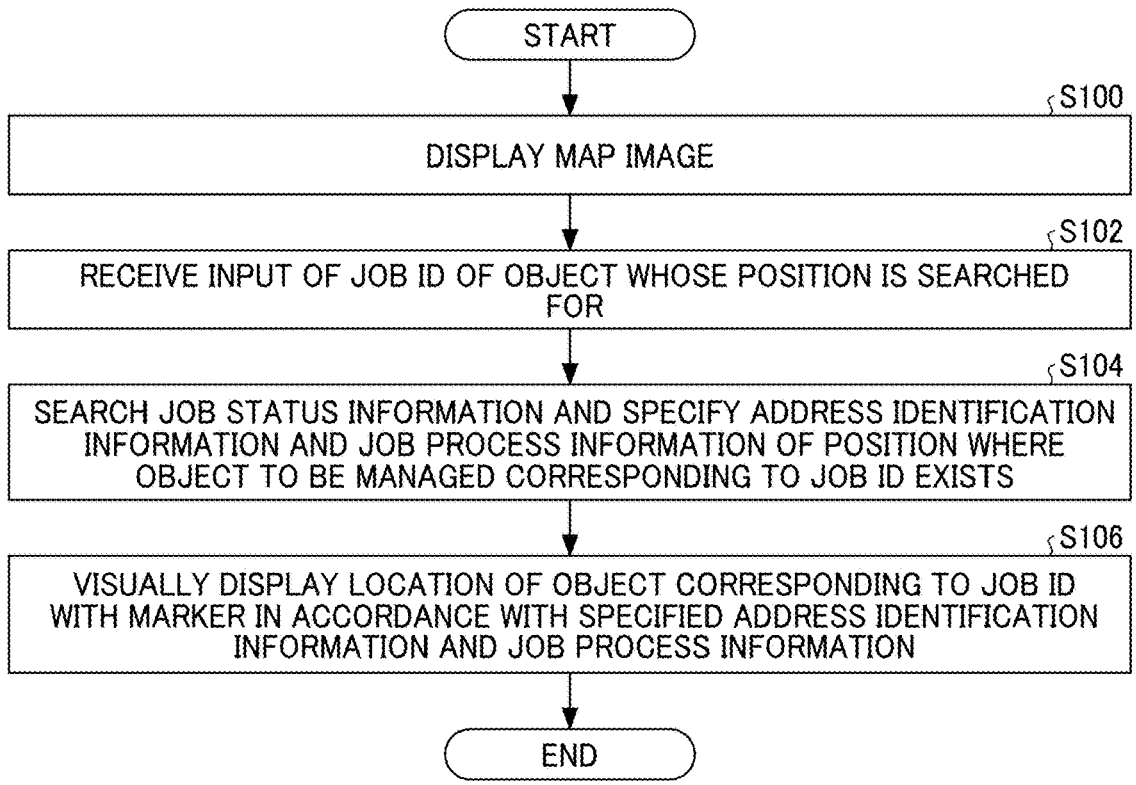

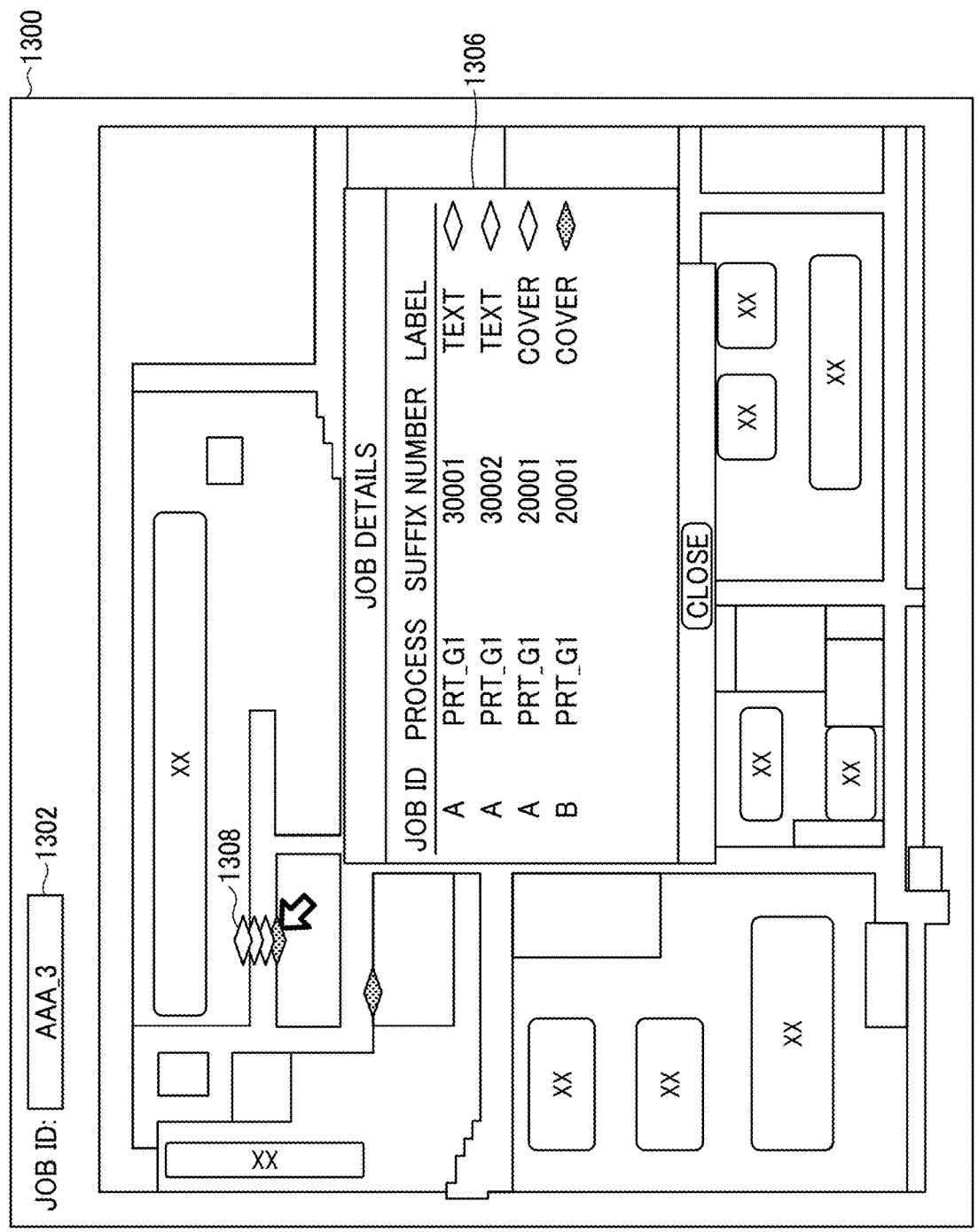

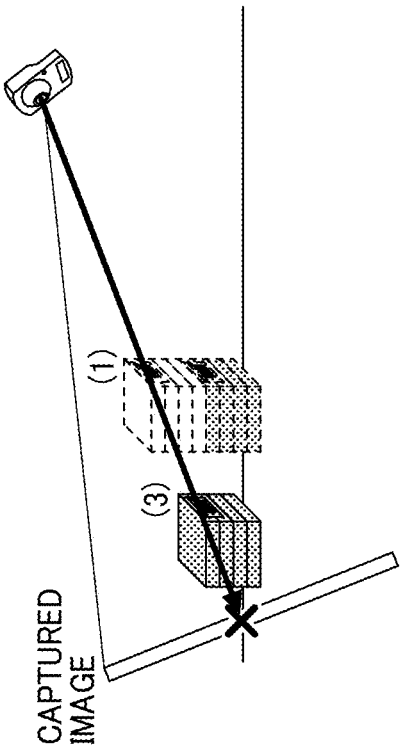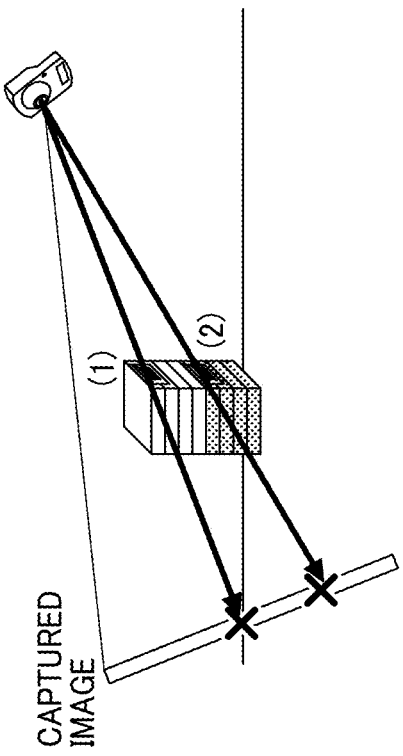

FIG. 24

CAMERA SETTING INFORMATION

| CAMERA IDENTIFICATION INFORMATION | REFERENCE CODE SIZE PLACED ON CENTER OF REFERENCE PLANE | CAMERA HEIGHT | CAMERA INCLINATION $\theta$ |
|---|---|---|---|
| CAMERA A | 100 | 4 m | 60° |
| CAMERA B | 100 | 4 m | 60° |
| ... | ... | ... | ... |
| CAMERA KK | 80 | 5 m | 60° |
| ... | ... | ... | ... |

FIG. 26

CAMERA SETTING INFORMATION

| CAMERA IDENTIFICATION INFORMATION | REFERENCE CODE SIZE PLACED ON CENTER OF REFERENCE PLANE | CAMERA HEIGHT | CAMERA INCLINATION $\theta$ | CAMERA INSTALLATION METHOD |
|---|---|---|---|---|
| CAMERA A | 100 | 4 m | 0° | UPPER INSTALLATION |
| CAMERA B | 100 | 4 m | 0° | UPPER INSTALLATION |
| ... | ... | ... | ... | |
| CAMERA KK | 80 | 5 m | 60° | LATERAL INSTALLATION |
| ... | ... | ... | ... | |

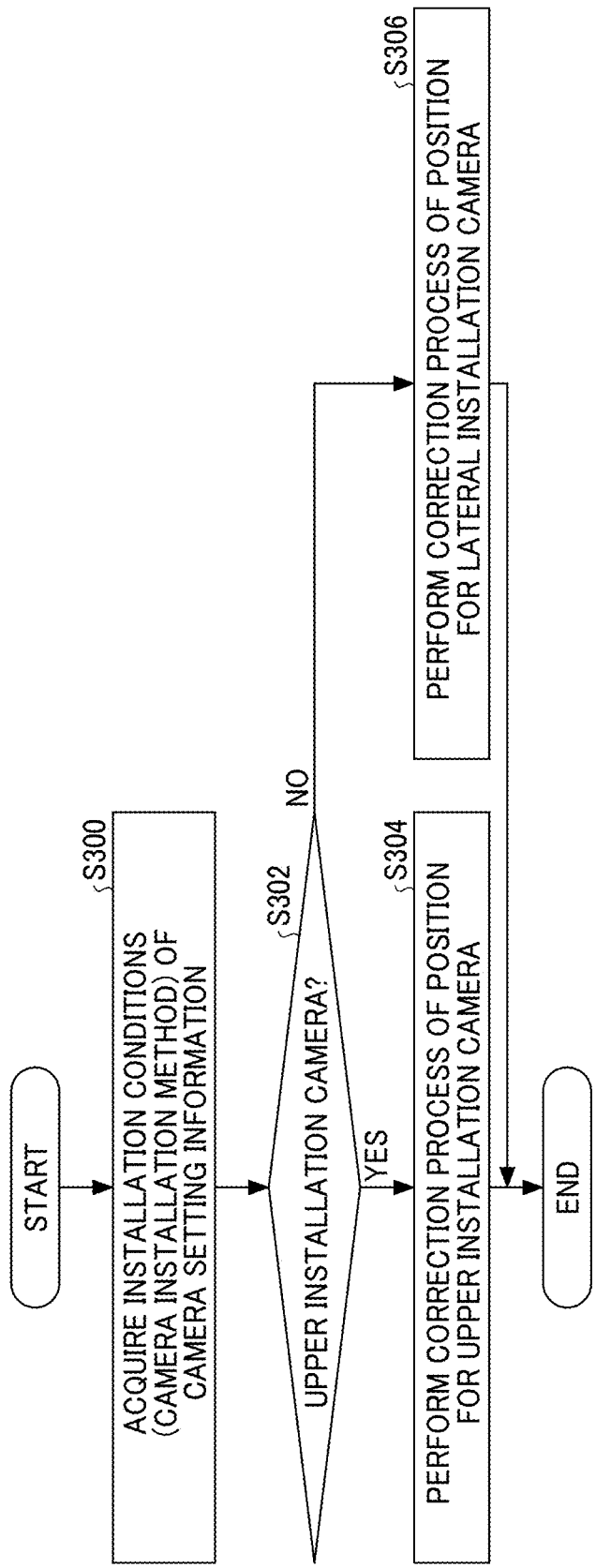

INFORMATION PROCESSING SYSTEM, POSITION MANAGEMENT METHOD, INFORMATION PROCESSING APPARATUS, AND STORAGE MEDIUM

CROSS-REFERENCE TO RELATED APPLICATION

This patent application is based on and claims priority pursuant to 35 U.S.C. § 119(a) to Japanese Patent Application No. 2021-046491, filed on Mar. 19, 2021, in the Japan Patent Office, the entire disclosure of which is hereby incorporated by reference herein.

BACKGROUND

Technical Field

Embodiments of the present disclosure relate to an information processing system, a location management method, an information processing apparatus, and a storage medium.

Related Art

Technologies are known for managing the progress of a job including a plurality of work processes by using a barcode or the like. For example, a technology is known in which a code image associated with a job is captured at each location associated with a work process, the job is recognized from the code image, and the work process associated with the captured location and the job recognized from the code image are managed in association with each other. In addition, a technology is known for managing a work process associated with a captured place and a job recognized from a code image in association with each other and providing information on the progress of a plurality of jobs including a plurality of work processes to a user.

SUMMARY

According to an embodiment of the present disclosure, there is provided an information processing system that includes an image capturing device, an information processing apparatus, and processing circuitry. The image capturing device is installed to capture an image of a range in which a position of an object to be managed is managed. The information processing apparatus recognizes a code image corresponding to the object from a captured image captured by the image capturing device and manage the position of the object. The processing circuitry generates spatial coordinate information of the code image based on a position of the code image recognized from the captured image, a size of the code image recognized from the captured image, and a size of a reference code image, and manages the position of the object corresponding to the code image, with plane coordinate information of the code image corrected using the spatial coordinate information of the code image.

In another embodiment of the present disclosure, there is provided a position management method to be executed by an information processing system that includes an image capturing device installed to capture an image of a range in which a position of an object to be managed is managed and an information processing apparatus configured to recognize a code image corresponding to the object from a captured image captured by the image capturing device and manage the position of the object. The method includes generating spatial coordinate information of the code image based on a position of the code image recognized from the captured image, a size of the code image recognized from the captured image, and a size of a reference code image, and manages the position of the object corresponding to the code image, with plane coordinate information of the code image corrected using the spatial coordinate information of the code image.

In still another embodiment of the present disclosure, there is provided an information processing apparatus to recognize a code image corresponding to an object to be managed, from a captured image captured by an image capturing device installed to capture an image of a range in which a position of the object is managed, to manage the position of the object. The information processing apparatus includes processing circuitry to generate spatial coordinate information of the code image based on a position of the code image recognized from the captured image, a size of the code image recognized from the captured image, and a size of a reference code image, and manage the position of the object corresponding to the code image, with plane coordinate information of the code image corrected using the spatial coordinate information of the code image.

In still yet another embodiment of the present disclosure, there is provided a non-transitory recording medium storing a plurality of instructions which, when executed by one or more processors, cause the processors to perform the position management method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 5A and 5B are diagrams illustrating an example of a case where the position of a color code cannot be correctly recognized;

FIGS. 6A, 6B, and 6C are diagrams illustrating an example of a method for correctly recognizing the position of a color code;

FIG. 11 is a diagram illustrating an example of the configuration of address setting information according to an embodiment of the present disclosure;

FIG. 12 is a diagram illustrating an example of the configuration of camera setting information according to an embodiment of the present disclosure;

FIG. 14 is a diagram illustrating an example of the configuration of job status information according to an embodiment of the present disclosure:

FIG. 15 is a flowchart illustrating an example of a correction process of a position where a color code is recognized, according to an embodiment of the present disclosure;

FIG. 16 is a diagram illustrating an example of a method of calculating the size of a color code in a reference plane from the size of the color code placed at the center of the reference plane, according to an embodiment of the present disclosure;

FIG. 17 is a flowchart illustrating an example of update processing of job status information in a job management system according to an embodiment of the present disclosure;

FIG. 18 is a flowchart illustrating an example of a map display process of a job management system according to an embodiment of the present disclosure;

FIG. 21 is an image diagram illustrating an example of another map screen of a job management system according to an embodiment of the present disclosure;

FIGS. 22A and 22B are diagrams illustrating an example of a case where the position of a color code cannot be correctly recognized;

FIG. 24 is a diagram illustrating an example of the configuration of camera setting information according to an embodiment of the present disclosure;

FIG. 26 is a diagram illustrating an example of the configuration of camera setting information according to an embodiment of the present disclosure; and FIG. 27 is a flowchart illustrating an example of a correction process of a position where a color code is recognized, according to an embodiment of the present disclosure.

Figure 1:
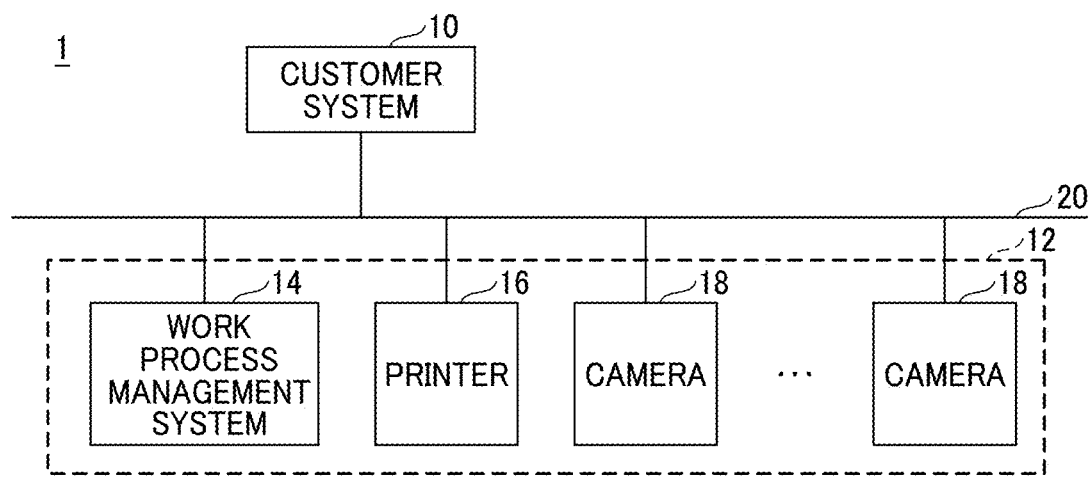
FIG. 1 is a diagram illustrating a configuration of a job management system according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments are described with reference to the drawings. In each drawing, the same configuration shares the same reference numeral and the overlapped description is omitted.

Hereinafter, embodiments of the present disclosure are described with reference to the drawings. In an embodiment of the present disclosure, an information processing system is described that recognizes the position of a color code image, which is an example of a code image, to achieve management of a job operation process in a printing factory. However, embodiments of the present disclosure are not limited to the printing factory. For example, embodiments of the present disclosure can also be applied to position recognition of various management objects such as position recognition of products in a factory and position recognition of delivery items in a collection place.

First Embodiment

System Configuration

FIG. 1 is a diagram illustrating a configuration of a job management system according to an embodiment of the present disclosure. FIG. 2 is an image diagram illustrating an example of a work instruction form used in the job management system according to the present embodiment. In a job management system 1 of FIG. 1, a customer system 10, a work process management system 14, a printer 16, and one or more cameras 18 are connected via a network 20 such as the Internet or a local area network (LAN) so as to be capable of data communications.

Figure 2B:
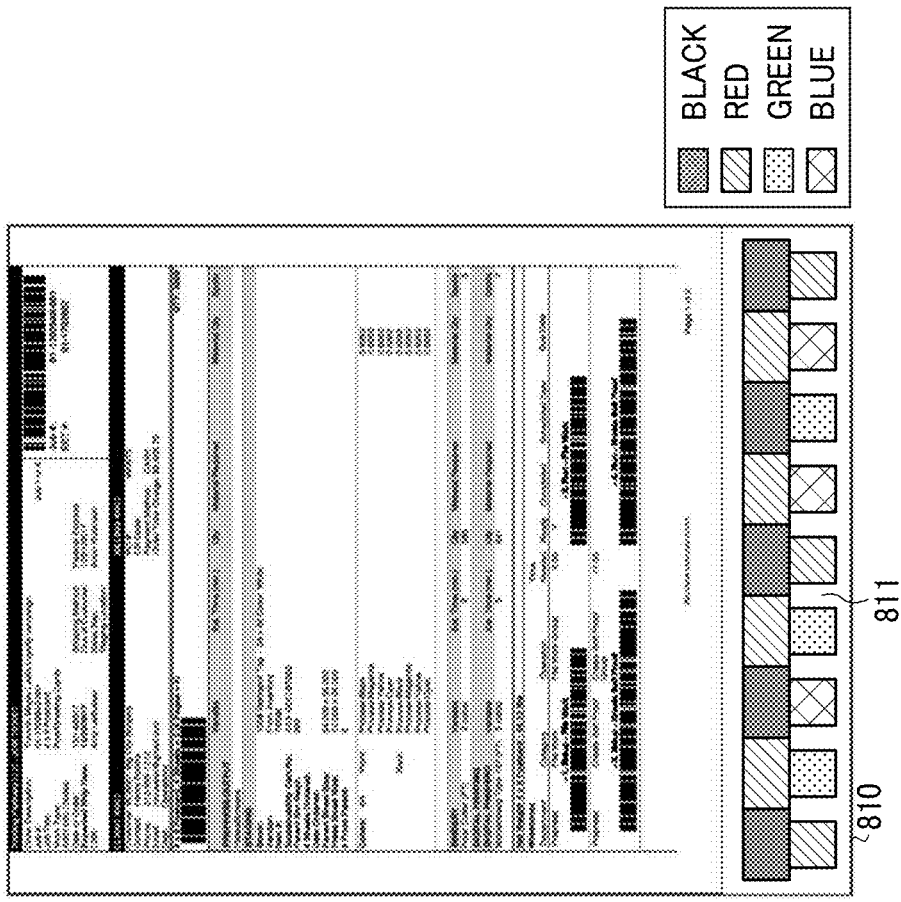
FIGS. 2A and 2B are image diagrams illustrating examples of a work instruction form used in the job management system of FIG. 1.
Figure 2A:
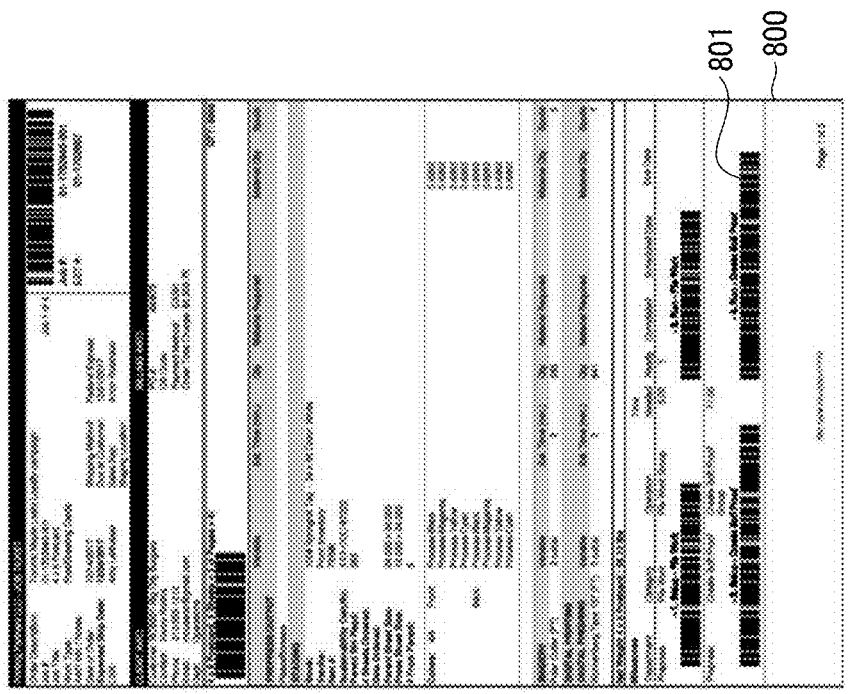

The customer system 10 is an example of an existing system used by a customer and creates a work instruction form 800 for the customer system 10 in FIG. 2A in which a job identification (ID) is displayed. The job ID is an example of identification information for identifying a job. In the work instruction form 800 for the customer system 10 in FIG. 2A, a barcode image 801 used on the customer system 10 is displayed.

Note that the job ID may be displayed as a barcode image 801 in the work instruction form 800 for the customer system 10 or may be displayed as text. The customer system 10 provides a user with an existing function achieved by the work instruction form 800 for the customer system 10.

The work process management system 14, the printer 16, and the one or more cameras 18 constitute at least part of an information processing system 12 that adds a new function to the work instruction form 800. The work process management system 14 manages the progress of a job including a plurality of work processes using a work instruction form 810 for the information processing system 12 to which a color code image 811 illustrated in FIG. 2B is assigned, as described below. The information processing system 12 can identify a job ID from the color code image 811 as described below.

The printer 16 prints the work instruction form 810 for the information processing system 12. The work instruction form 810 for the information processing system 12 may be referred to as a work instruction form provided with a color code image. The cameras 18 are installed so as to be able to capture positions associated with work processes of a job in a printing factory. Note that the positions associated with the work processes of the job are places included in a range in which the position of an object to be managed is managed, for example, a place through which an object to be managed such as a printed matter passes by movement between the work processes, or a temporary storage place where an object to be managed is temporarily stored.

For example, a pan tilt zoom (PTZ) camera or an Internet protocol (IP) camera can be used as the camera 18. The PTZ camera is a camera capable of operating pan, tilt, and zoom functions via the network 20, and is a camera capable of transmitting a captured image or a captured moving image via the network 20. The IP camera is a camera that can be operated via the network 20 and can transmit a captured image or a captured moving image via the network 20. A captured image or a captured moving image captured by the camera 18 is transmitted to the work process management system 14 via the network 20. The camera 18 is an example of an image capturing device.

In the information processing system 12 in which a new function is added to the work instruction form 800, the work instruction form 810 for the information processing system 12 is attached to a printed matter that is an example of an intermediate product or a material of a job corresponding to the work instruction form 810. For example, the work instruction form 810 is attached on an object to be managed such as a printed matter that is easily captured by the cameras 18.

The work process management system 14 recognizes a color code image of a work instruction form from images captured by the respective cameras 18, and thus manages the location of an object to be managed as described below. The work process management system 14 also manages the position of the object to be managed, and thus manages the progress of a work process of a job, that is, a state of a job. The work process management system 14 may manage a history of work processes of a job, and a captured image or a captured moving image representing a state when the work instruction form 810 is captured.

The configuration of the job management system 1 illustrated in FIG. 1 is an example. For example, the job management system 1 may include another system, or the work process management system 14 may be another name such as an information processing apparatus. The work process management system 14 may be implemented by a single server environment or by a plurality of server environments.

Hardware Configuration

Figure 3:
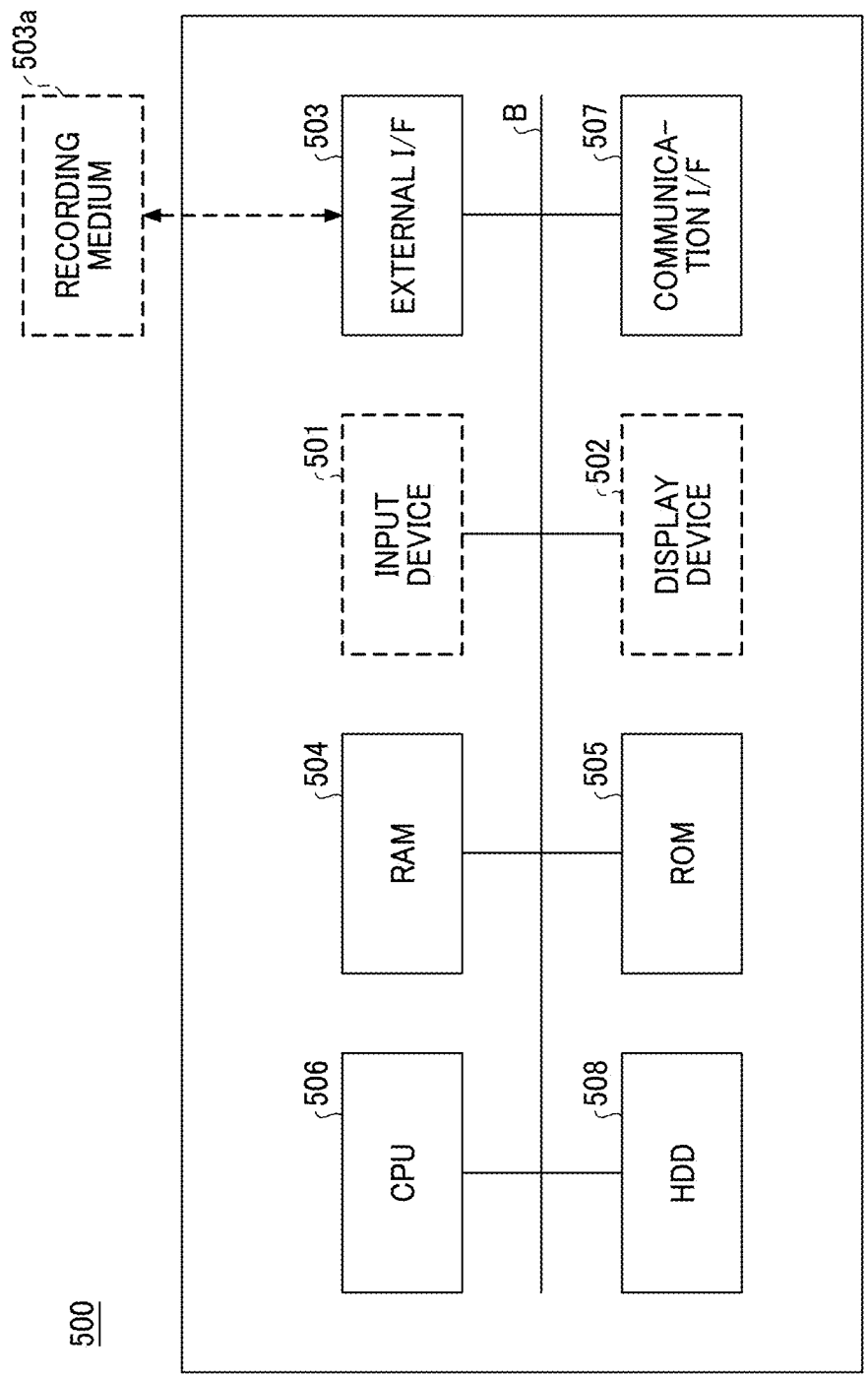
FIG. 3 is a diagram illustrating a hardware configuration of a computer according to an embodiment of the present disclosure.

The customer system 10 and the work process management system 14 are implemented by, for example, a computer 500 having a hardware configuration illustrated in FIG. 3.

FIG. 3 is a diagram illustrating a hardware configuration of a computer according to an embodiment of the present disclosure. A computer 500 of FIG. 3 includes, for example, an input device 501, a display device 502, an external interface (I/F) 503, a random access memory (RAM) 504, a read-only memory (ROM) 505, a central processing unit (CPU) 506, a communication I/F 507, a hard disk drive (HDD) 508 that are connected to each other by a bus B. Note that the input device 501 and the display device 502 may be connected and used when necessary.

The input device 501 includes, for example, a keyboard, a mouse, and a touch screen and is used by a user to input various operation signals. The display device 502 includes, for example, a display and displays a processing result by the computer 500.

The communication I/F 507 is an interface for connecting the computer 500 to various networks. Thus, the computer 500 can perform data transmission via the communication I/F 507.

The HDD 508 is an example of a non-volatile storage device that stores programs and information. The stored programs and data include an operating system (OS), which is basic software for controlling the entire computer 500, and application software (hereinafter simply referred to as "application") for providing various functions on the OS. Instead of the HDD 508, the computer 500 may include a drive device (for example, a solid state drive (SSD)) that uses a flash memory as a storage medium.

The external I/F 503 is an interface with an external device. Examples of the external device include a recording medium 503*a*. Such a configuration allows the computer 500 to read from and write to the recording medium 503*a* via the external I/F 503. Examples of the recording medium 503*a* include flexible disks, compact discs (CDs), digital versatile discs (DVDs), secure digital (SD) memory cards, and universal serial bus (USB) memories.

The ROM 505 is an example of a nonvolatile semiconductor memory (storage device) that can hold programs and data even when the power is turned off. The ROM 505 stores programs such as a basic input/output system (BIOS), an operating system (OS) setting, and a network setting, which are executed when the computer 500 is activated. The RAM 504 is an example of a volatile semiconductor memory (storage device) that temporarily stores programs and data.

The CPU 506 is an arithmetic device that reads programs and information from a storage device such as the ROM 505 or the HDD 508 onto the RAM 504 and execute processing to achieve control and functions of the entire computer 500. The customer system 10 and the work process management system 14 can achieve various processes to be described below by a hardware configuration of a computer 500 as illustrated in FIG. 3, for example.

Software Configuration

Figure 4:
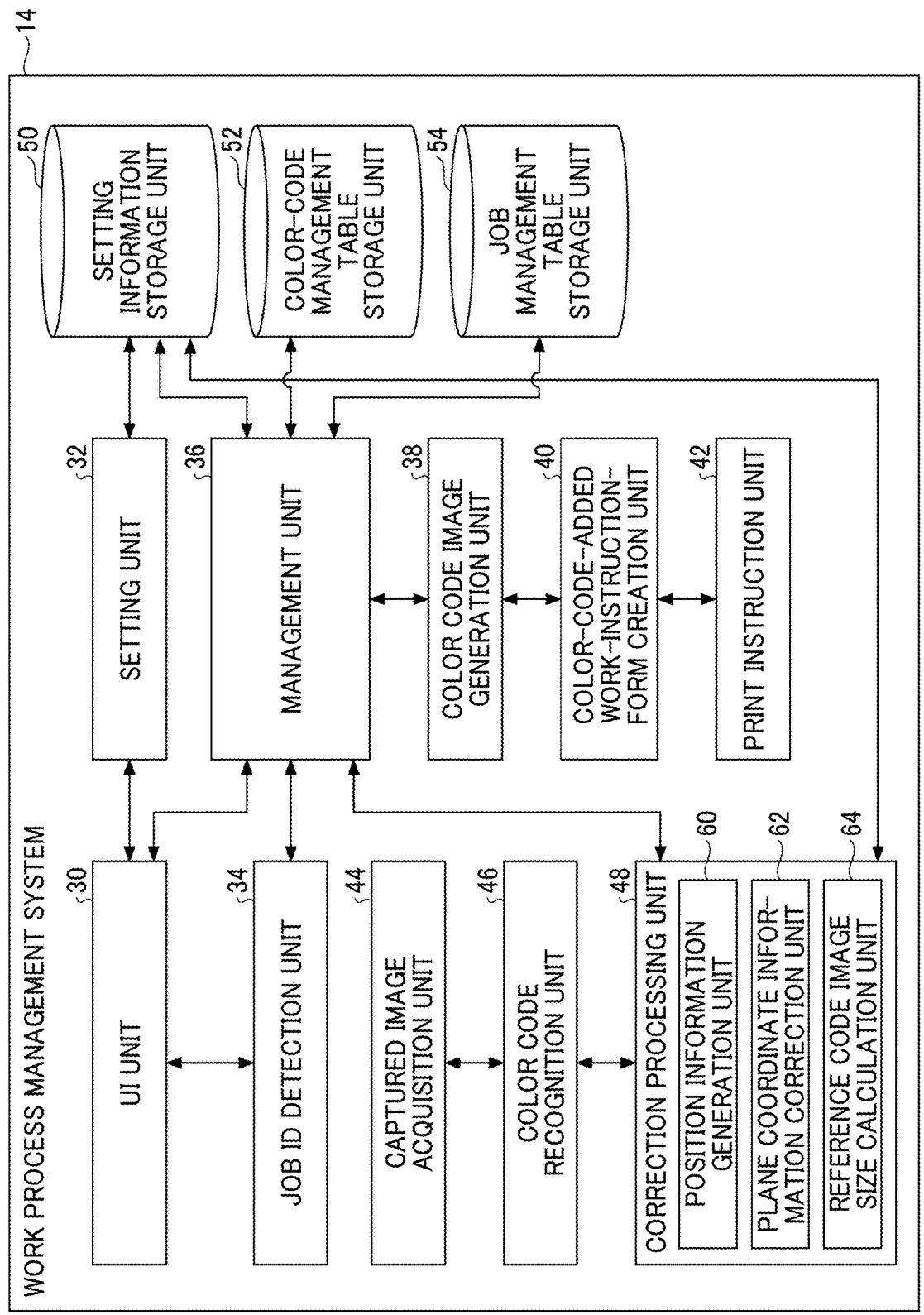
FIG. 4 is a diagram illustrating a functional configuration of a work process management system according to an embodiment of the present disclosure.

FIG. 4 is a diagram illustrating a functional configuration of the work process management system according to the present embodiment. In the diagram of the functional configuration illustrated in FIG. 4, configurations unnecessary for the description of the present embodiment are omitted as appropriate. The work process management system 14 illustrated in FIG. 4 includes a user interface (UI) unit 30, a setting unit 32, a job ID detection unit 34, a management unit 36, a color code image generation unit 38, a color-code-added work-instruction-form creation unit 40, a print instruction unit 42, a captured image acquisition unit 44, a color code recognition unit 46, a correction processing unit 48, a setting information storage unit 50, a color-code management table storage unit 52, and a job management table storage unit 54. The correction processing unit 48 includes a position information generation unit 60, a plane coordinate information correction unit 62, and a reference code image size calculation unit 64.

The UI unit 30 controls the display of various screens such as various setting screens for receiving various necessary settings from a user and a map screen for visually displaying the location of an object to be managed as a marker. The setting unit 32 receives setting of setting information such as address setting information and camera setting information described below from a user, and controls a process of storing the setting information in the setting information storage unit 50. For example, the setting unit 32 controls processing such as reception of designation of a map image including a range for managing the position of an object to be managed, provision of address identification information to squares of divided map images, and association with job process information.

The setting unit 32 divides a captured image captured by each camera 18 into four divided images, and sets, to each divided image in the captured image, address identification information capable of specifying a square of a map image captured by each divided image. The setting unit 32 controls the processing such that the same address identification information is set even for divided images in captured images captured by different cameras 18 as long as the divided images capture the same squares. As described above, the same address identification information is set to the divided images of the cameras 18 capturing the same squares even if the cameras 18 are different. For example, the job ID detection unit 34 detects a job ID displayed as a barcode image 801 or text in the work instruction form 800 for the customer system 10 in FIG. 2A.

The management unit 36 stores and manages available color code IDs in the color-code management table storage unit 52. The management unit 36 selects an unused color code ID from the color-code management table storage unit 52. The management unit 36 manages the job ID detected by the job ID detection unit 34 and the selected color code ID in association with each other in the color-code management table storage unit 52.

The management unit 36 also stores and manages job information corresponding to the job ID and the color code ID in the job management table storage unit 54. The job management table storage unit 54 manages progress information, history information, and the like of job work processes, and such information is used for visually displaying the location of an object as a marker on a map screen described below.

The color code image generation unit 38 generates, for example, a color code image 811 illustrated in FIG. 2B from the color code ID provided from the management unit 36. For example, the color-code-added work-instruction-form creation unit 40 creates the work instruction form 810 for the information processing system 12 to which the color code image 811 of FIG. 2B is attached, from the work instruction form 800 for the customer system 10 of FIG. 2A. For example, the print instruction unit 42 instructs the printer 16 to print the work instruction form 810 for the information processing system 12 to which the color code image 811 of FIG. 2B is added.

The captured image acquisition unit 44 acquires a captured image or a captured moving image from the cameras 18. The color code recognition unit 46 recognizes a color code image 811 included in the captured image or the captured moving image. The color code recognition unit 46 decodes a color code ID from the recognized color code image 811. The color code recognition unit 46 provides, for example, camera identification information for identifying the camera 18 that has captured the color code image 811, the decoded color code ID, and the captured image from which the color code image 811 has been recognized, to the correction processing unit 48.

The correction processing unit 48 calculates the spatial position of the color code image 811 as described below and improves the detection accuracy of the plane position of the color code image 811 even when there is a variation in the height of the color code image 811 included in the captured image.

The position information generation unit 60 is a position information generator that calculates the spatial position of the color code image 811 based on the size of the color code image 811 included in the captured image and a reference code size described below and generates information (spatial coordinate information) indicating the spatial position of the color code image 811, as described below.

The plane coordinate information correction unit 62 corrects information (plane coordinate information) indicating the plane position of the color code image 811 recognized from the captured image, as described below, using the spatial coordinate information generated by the position information generating unit 60. The reference code image size calculation unit 64 calculates the size of a reference code image on a reference plane other than the center of the reference plane, as described below, from the size of the reference code image in a captured image obtained by capturing the reference code image placed at the center of the reference plane such as the ground with the camera 18.

The correction processing unit 48 provides the management unit 36 with camera identification information for identifying the camera 18 that has captured the color code image 811, the decoded color code ID, the captured image from which the color code image 811 has been recognized, and plane coordinate information of the corrected color code image 811.

The management unit 36 specifies the job ID corresponding to the decoded color code ID by referring to the color-code management table storage unit 52. In addition, by referring to the setting information storage unit 50, the management unit 36 can accurately specify the divided image of the camera 18 that has recognized the color code image from the plane coordinate information of the corrected color code image 811, and can specify the address identification information set in the specified divided image.

The management unit 36 can update job status information, which is described below, managed by the job management table storage unit 54, based on the work process of the job corresponding to the divided image of the camera 18 that has captured the color code image and the job ID corresponding to the decoded color code ID.

Each functional unit of the work process management system 14 and the customer system 10 may be mounted on an information processing apparatus or a server apparatus in a LAN, or may be configured as an information processing apparatus or a web server on the Internet and provided as a cloud service. For example, the information processing apparatus may receive a request, from a terminal device of a user via a network such as the Internet and return various screens, or may receive an input from a screen and execute setting. The information processing apparatus may also receive an image from an installed camera, recognize a code image, transmit a map screen to software such as a web browser of a terminal device, and update a position, a work situation, or the like of an object to be managed in real time using a bidirectional communication protocol.

Recognition of Position of Color Code Image

First, a description is given of an example in which the plane position of the color code image 811 cannot be correctly recognized when the position of the color code image 811 is recognized from a captured image captured by the camera 18. FIGS. 5A and 5B are diagrams illustrating an example of a case where the position of a color code cannot be correctly recognized.

In FIG. 5A, a color code image (1) exists. FIG. 5B illustrates a color code image (2). The color code image (1) is present at a lower position than the color code image (2). The color code images (1) and (2) are examples of color code images having a variation in height. Although FIGS. 5A and 5B illustrate both color code images (1) and (2) at the same tune for ease of comparison, the color code images (1) and (2) are not present at the same time but one of the color code images (1) and (2) is present.

As illustrated in FIGS. 5A and 5B, in a case where the color code images (1) and (2) are present on a straight line in the image capturing direction even when the color code images (1) and (2) are present at different spatial positions, the camera 18 would produce a captured image as if the color code images (1) and (2) are present at the same plane position. Accordingly, in the example of FIGS. 5A and 5B, when the plane positions of the color code images (1) and (2) are detected from the captured image, it would be recognized that the color code images (1) and (2) at different positions are present at the same plane position.

For this reason, in the present embodiment, the plane position of the color code image is accurately detected by the method illustrated in FIGS. 6A, 6B, and 6C. FIGS. 6A, 6B, and 6C are diagrams illustrating an example of a method for correctly recognizing the position of a color code. In the method illustrated in FIGS. 6A, 6B, and 6C, the size of a color code image in a captured image obtained when the color code image placed at the center of a reference plane such as the ground is captured by the camera 18 is set as the size of the reference code image. In the method illustrated in FIGS. 6A, 6B, and 6C, the size of the color code image whose plane position is to be detected is detected from a captured image captured by the camera 18.

In the method illustrated in FIGS. 6A, 6B, and 6C, as described below, the spatial position of the color code image is calculated from the size of the color code image, the size of the reference code image, the plane position of the color code image recognized from the captured image, and the height of the camera 18. Thus, the plane position of the color code image is corrected.

FIG. 6A illustrates the relations among the size $S_1$ of the reference code image, the plane position $X_1$ of the color code image recognized from the captured image, the height $H_1$ of the camera 18 from the reference plane, the size $S_2$ of the color code image of the captured image, the plane position $X_2$ of the color code image to be calculated, and the height $H_2$ of the camera 18 with respect to the plane of the color code image to be calculated.

In the example of FIG. 6, using the similarity relation, the relation between the size $S_1$ of the reference code image, the size $S_2$ of the color code image of the captured image, the plane position $X_1$ of the color code image recognized from the captured image, and the plane position $X_2$ of the color code image to be calculated can be expressed by the following expression (1).

The relation between the size $S_1$ of the reference code image, the size $S_2$ of the color code image of the captured image, the height $H_1$ of the camera 18 from the reference plane, and the height $H_2$ of the camera 18 with respect to the plane of the color code image to be calculated can be expressed by the following expression (2).

$$1/S_1 : 1/S_2 = X_1^2 : X_2^2 \quad (1)$$

$$1/S_1 : 1/S_2 = H_1^2 : H_2^2 \quad (2)$$

Expression (3) for calculating the plane position $X_2$ of the color code image can be obtained from the above expression (1). Expression (4) for calculating the height $H_2$ of the camera 18 with reference to the plane of the color code image can be obtained from the above expression (2).

$$X_2 = (S_1/S_2)^{1/2} \times X_1 \quad (3)$$

$$H_2 = (S_1/S_2)^{1/2} \times H_1 \quad (4)$$

Note that the above expressions (1) to (4) are calculations in the X-axis direction, and the spatial position (spatial coordinates) of the color code image can be obtained by calculating the Y-axis direction in the same manner, and the plane position (plane coordinates) of the color code image can be corrected using the spatial coordinates.

FIG. 6B illustrates that the reference code image of the size $S_1$ and the color code image of the size $S_2$ in FIG. 6A are captured at the same position on the captured image by the camera 18. In the present embodiment, for example, as illustrated in FIGS. 6C and 6D, the spatial coordinates of the color code image can be calculated based on the size $S_1$ of the reference code image and the size $S_2$ of the color code image, and can be corrected to the plane coordinates of the correct color code image.

For example, in the example of FIG. 6A, when the height $H_1$ of the camera 18 from the reference plane is 4 m, the size $S_2$ of the color code image of the captured image is 400, the plane position $X_1$ of the color code image recognized from the captured image is 2 m, and the size $S_1$ of the reference code image is 100, the plane position $X_2$ of the color code image and the height $H_2$ of the camera 18 with respect to the plane of the color code image can be calculated as follows.

$$X_2 = (S_1/S_2)^{1/2} \times X_1$$
$$= (100/400)^{1/2} \times 2$$
$$= 1 \text{ m}$$
$$H_2 = (S_1/S_2)^{1/2} \times H_1$$
$$= (100/400)^{1/2} \times 4$$
$$= 2 \text{ m}$$

Processing

Hereinafter, a description is given of a preparation process necessary for achieving the management of the work processes of the job in the printing factory by grasping the position of the color code image in the job management system 1 according to the present embodiment and a management process for achieving the management of the work processes of the job in the printing factory by grasping the position of the color code image.

Preparation Process

Figure 7:
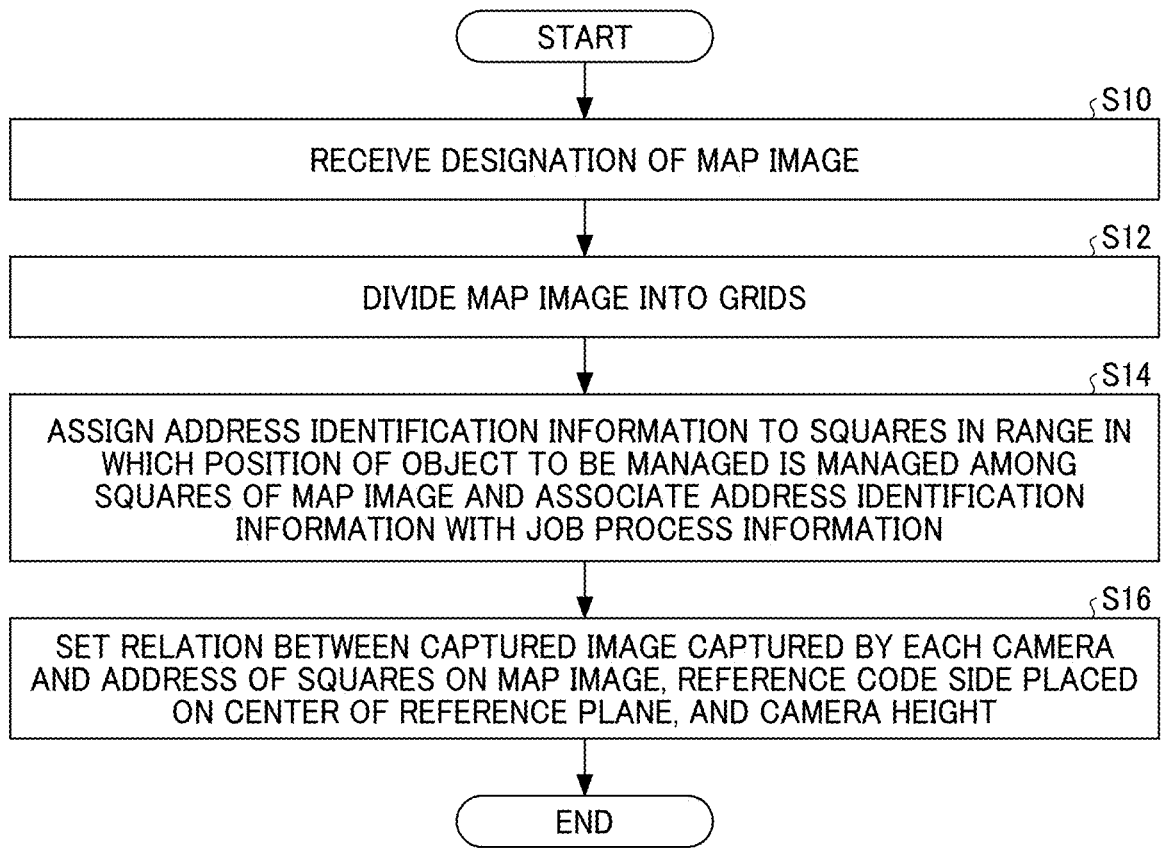
FIG. 7 is a flowchart illustrating an example of a preparation process of an information processing system according to an embodiment of the present disclosure.

FIG. 7 is a flowchart illustrating an example of a preparation process of an information processing system according to an embodiment of the present disclosure. In step S10, a user uploads, for example, a map image of a printing, factory including a range in which the position of an object to be managed is managed. The UI unit 30 of the work process management system 14 receives an operation for designating the map image from a user. The setting unit 32 receives designation of the map image by the user.

Figure 8:
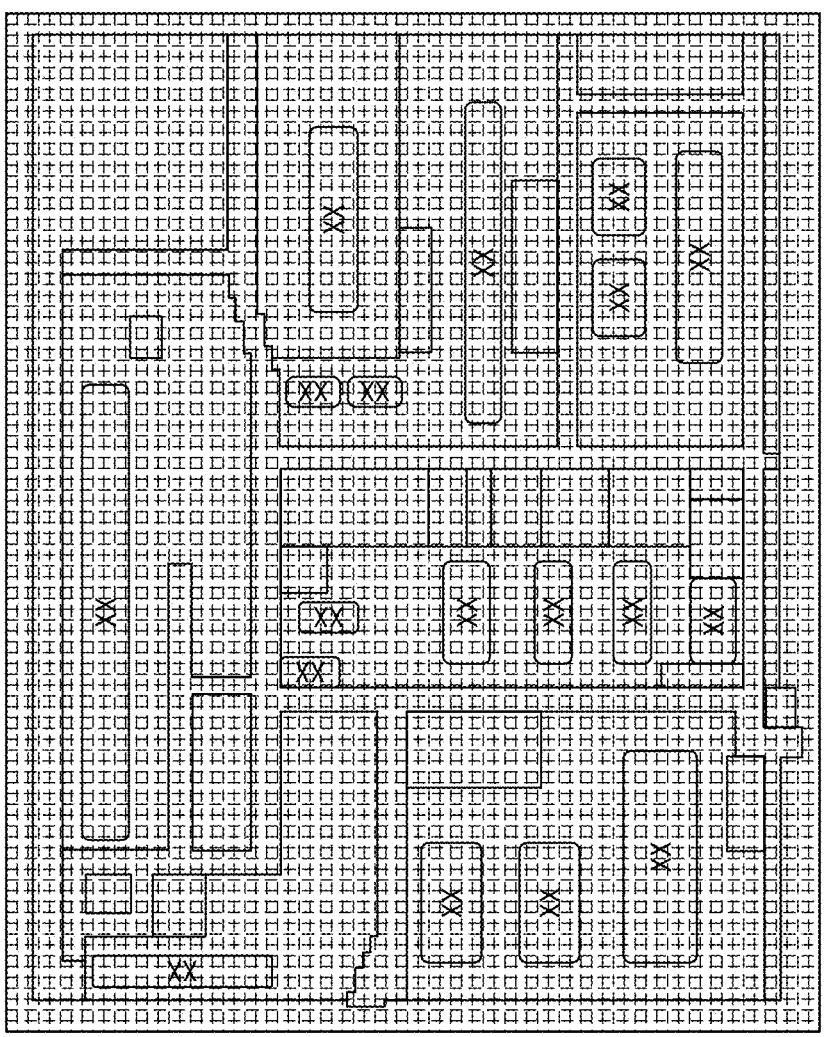
FIG. 8 is an image diagram illustrating an example of a grid setting screen.

In step S12, the UI unit 30 may display a grid setting screen 1000 as illustrated in FIG. 8, for example, and may receive a setting necessary for dividing the map image into squares from the user.

FIG. 8 is an image diagram illustrating an example of the grid setting screen. On the grid setting screen 1000 illustrated in FIG. 8, the user can manually input the number of squares in grid by the number of columns×the number of rows. In the grid setting screen 1000 illustrated in FIG. 8, the number of squares can also be automatically set based on the capturing range (for example, 2 in×2 m) of the camera 18 in response to the user's input of the width and depth of the floor or the floor space. For example, in the case of a floor of width 40 in×depth 20 m, squares of 20 columns×10 rows are automatically assigned to the map image. The UI unit 30 may receive, from the user, editing of squares automatically assigned to the map image. By the user's input to the grid setting screen 1000, for example, as illustrated in the map image of the grid setting screen 1000 of FIG. 8, the UI unit 30 additionally displays the grid so that the divided squares can be visually recognized.

Figure 9:
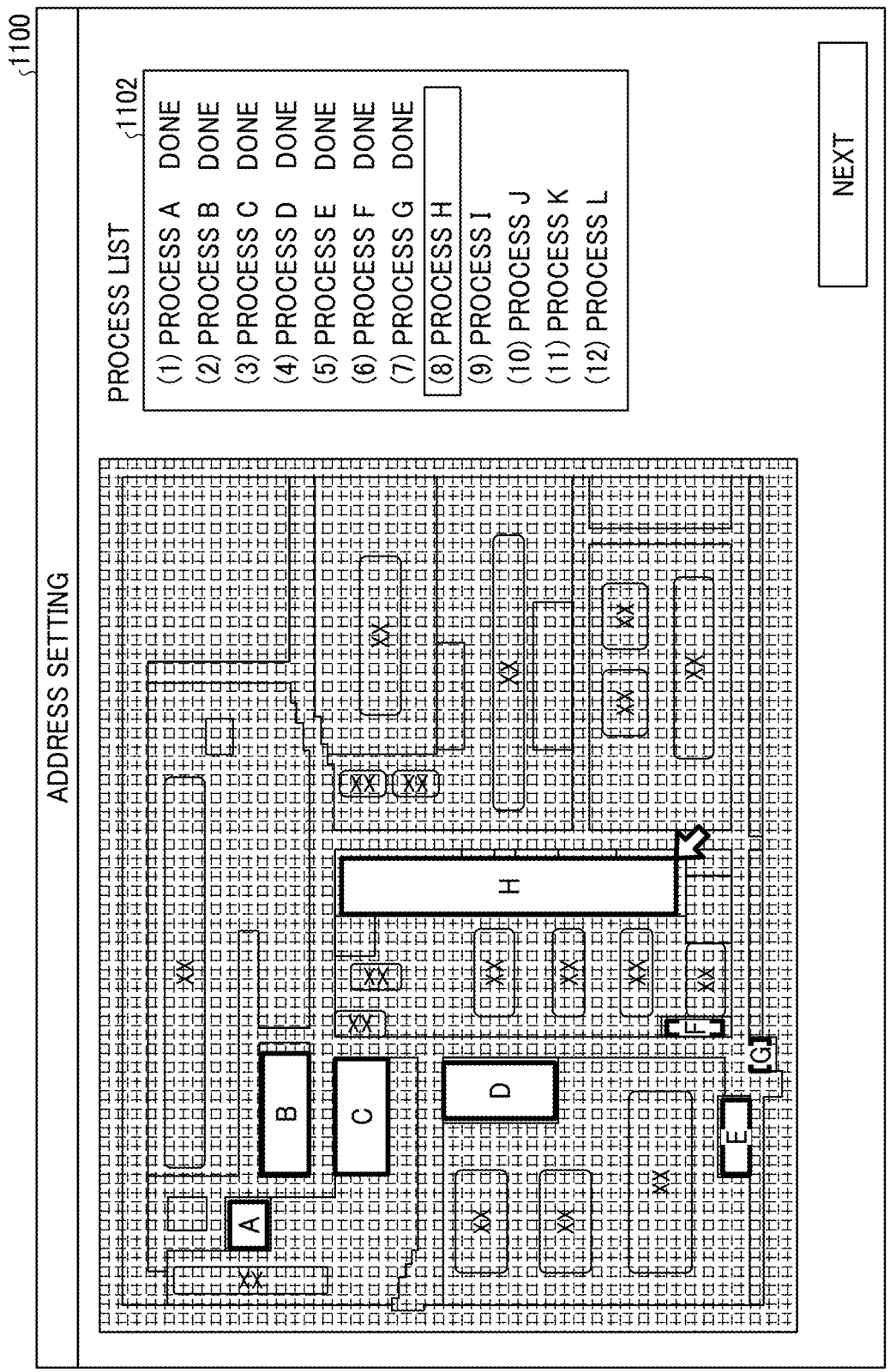
FIG. 9 is an image diagram illustrating an example of an address setting screen.

In step S14, the UI unit 30 displays, for example, an address setting screen 1100 as illustrated in FIG. 9, and receives, from the user for each work process, setting of squares in the range in which the position of the object to be managed is managed among squares of the map image.

FIG. 9 is an image diagram illustrating an example of the address setting screen. For example, in the address setting screen 1100 of FIG. 9, the user can select a work process to be associated with a square from a process list 1102 and designate, with a mouse or the like, a range of squares of a place where the work process is to be arranged. For example, in the example of the map image of FIG. 9, the range specification of squares corresponding to work processes A to G has been received from the user, and the range specification of the squares corresponding to the work process H is being received. The setting unit 32 assigns address identification information to squares of a place where a work process is arranged among squares of the map image and associates job process information for identifying the work process with the address identification information.

It is assumed that a plurality of cameras 18 are installed at positions where the cameras 18 can capture squares (squares corresponding to the work processes A to L of the job) in a range in which the position of the object to be managed is managed among the squares of the map image.

Figure 10:
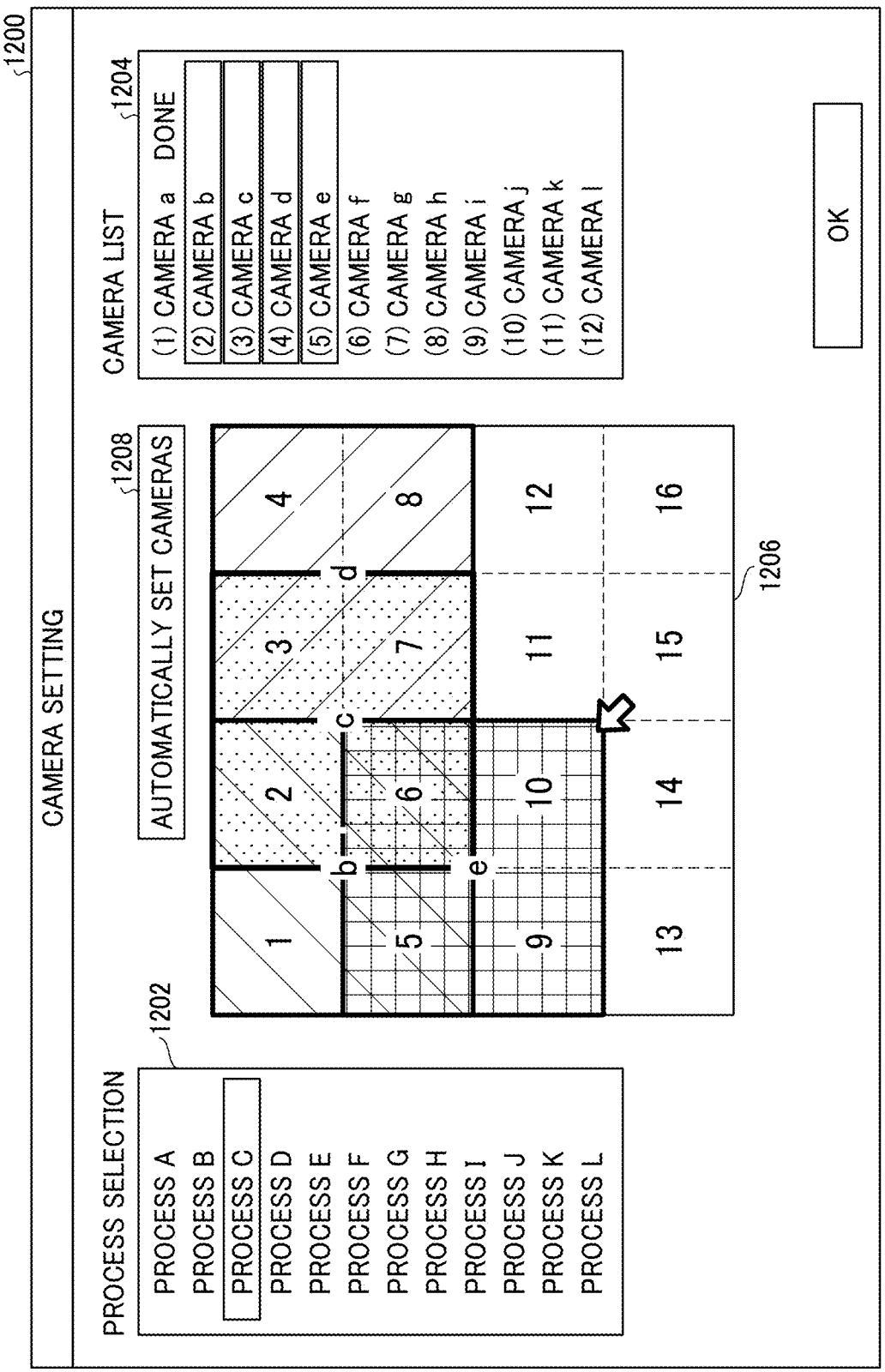
FIG. 10 is an image diagram illustrating an example of a camera setting screen.

In step S16, the UI unit 30 displays a camera setting screen 1200 as illustrated in FIG. 10, for example, and allocates the camera 18 that captures the squares of each work process. FIG. 10 is an image diagram illustrating an example of a camera setting screen.

For example, in the camera setting screen 1200 of FIG. 10, when the user selects one work process from a process selection field 1202, a plurality of squares in which the work process is arranged are displayed in a camera arrangement field 1206. In FIG. 10, 16 squares of 4×4 in which the work process C is arranged are displayed as an example.

The user selects cameras 18 to be arranged in a plurality of squares displayed in the camera arrangement field 1206 from a camera list 1204, and specifies the range of four squares of 2×2 in which the cameras 18 are arranged with a mouse or the like. Note that the camera list 1204 may display cameras associated with other work processes in a grayed-out manner or with a completion mark(s).

For example, in the camera setting screen 1200 of FIG. 10, among squares of address identification information "1" to "16" associated with the work process of "process C", "camera b" is arranged in address identification information "1", "2", "5", and "6", "camera c" is arranged in address identification information "2", "3", "6", and "7", "camera d" is arranged in address identification information "3", "4", "7", and "8", and "camera e" is arranged in address identification information "5", "6", "9", and "10".

Note that the camera setting screen 1200 of FIG. 10 includes an "automatically set cameras" key 1208, and the cameras 18 may be automatically arranged as illustrated in the camera arrangement field 1206 of FIG. 10, for example, by receiving a pressing operation of a key 1208 from the user. In the case of the work process of 16 squares of 4×4 illustrated in the camera arrangement field 1206 of FIG. 10, nine cameras 18 are arranged. The number of cameras 18 to be arranged is (n−1)×(m−1) when the squares of the work process are n×m.

The user operates the camera setting screen 1200 of FIG. 10 to set the address identification information of squares captured by the divided images of the plurality of cameras 18. The setting unit 32 can associate the camera identification information, the address identification information, and the job process information with, for example, each of the four divided image obtained by dividing the captured image of each of the cameras 18.

In step S16, the UI unit 30 receives setting of the reference code size placed at the center of the reference plane and the height of the camera 18. The setting of the reference code size and the height of the camera 18 is not limited to the timing of the step S16.

Through the processing of the flowchart of FIG. 7, the setting unit 32 can store the address setting information as illustrated in FIG. 11 and the camera setting information as illustrated in FIG. 12 in the setting information storage unit 50. FIG. 11 is a diagram illustrating an example of the configuration of address setting information according to the present embodiment. FIG. 12 is a diagram illustrating an example of the configuration of camera setting information according to the present embodiment.

The address setting information in FIG. 11 associates camera identification information, address identification information, a region of a divided image in a captured image, and job process information with each other. The camera identification information is an example of identification information for identifying the camera 18. The address identification information is an example of identification information for identifying squares divided from the map image. The region of the divided image in the captured image is an example of identification information for identifying (or cutting out) a region of a divided image in the captured image captured by the camera 18. The job process information is an example of identification information for identifying a work process.

Using the address setting information illustrated in FIG. 11, the work process management system 14 can specify the address identification information of the squares captured by the divided images of the cameras 18 and the job process information for identifying the work process at the positions of the squares. In the address setting information of FIG. 11, a plurality of cameras 18 are set to redundantly capture squares to which the same address identification information is assigned, for example, as in an upper-right divided image of an image captured by the camera A and an upper-left divided image of an image captured by the camera B.

In the camera setting information of FIG. 12, camera identification information, a reference code size placed at the center of a reference plane, and a camera height are associated with each other. The reference code size placed at the center of the reference plane is an example of information indicating the size of a reference code image captured in a captured image when the reference code image placed at the center of the reference plane such as the ground is captured with the camera 18 indicated by the camera identification information. The camera height is an example of information indicating the height of the camera 18 from the reference plane indicated by the camera identification information.

Management Process

For example, work processes of a job in a printing factory include printing, cutting, folding, bookbinding, inspection, and temporary storage. The camera 18 is installed so as to be able to capture a range in which an object to be managed is placed in the work processes of the job. For example, it is assumed that a work instruction form with a color code image added thereto is attached to the object at a position where the object can be captured by the camera 18.

The information processing system 12 according to the present embodiment attaches a work instruction form to which a color code image capable of specifying a job ID is added onto an object to be managed such as a printed matter and causes the camera 18 to capture the work instruction form, to manage the progress of a job including a plurality of work processes.

The work instruction form to which the color code image is added is created, for example, as follows. The management unit 36 of the work process management system 14 selects a color code ID to be used from the color-code management table storage unit 52, and manages the selected color code ID and a job ID of a job for creating a work instruction form in association with each other.

The color code image generation unit 38 generates a color code image from the color code ID associated with the job ID using a technique described in, for example, Japanese Unexamined Patent Application Publication No. 2017-199306 and Japanese Unexamined Patent Application Publication No. 2020-024658 or U.S. Patent Application Publication No. 2020-034592 which is incorporated by reference herein. The color-code-added work-instruction-form creation unit 40 creates a work instruction form to which a color code image is added using the generated color code image.

The print instruction unit 42 instructs the printer 16 to print the work instruction form (color-code-added work instruction form) to which the color code image is added. The printer 16 prints the work instruction form to which the color code image is added by an instruction from the print instruction unit 42.

For example, in a printing factory, after a primed matter is output by work processes of printing, a work instruction form to which a color code image is added is attached on the printed matter. After being attached on the printed matter which is an example of the object to be managed, the work instruction form to which the color code image is added is captured by the cameras 18 in the work processes of the job. As described above, in the job management system 1 according to the present embodiment, a color code image of a work instruction form attached on a printed matter, which is an example of an object to be managed, is captured in work processes of a job.

Figure 13:
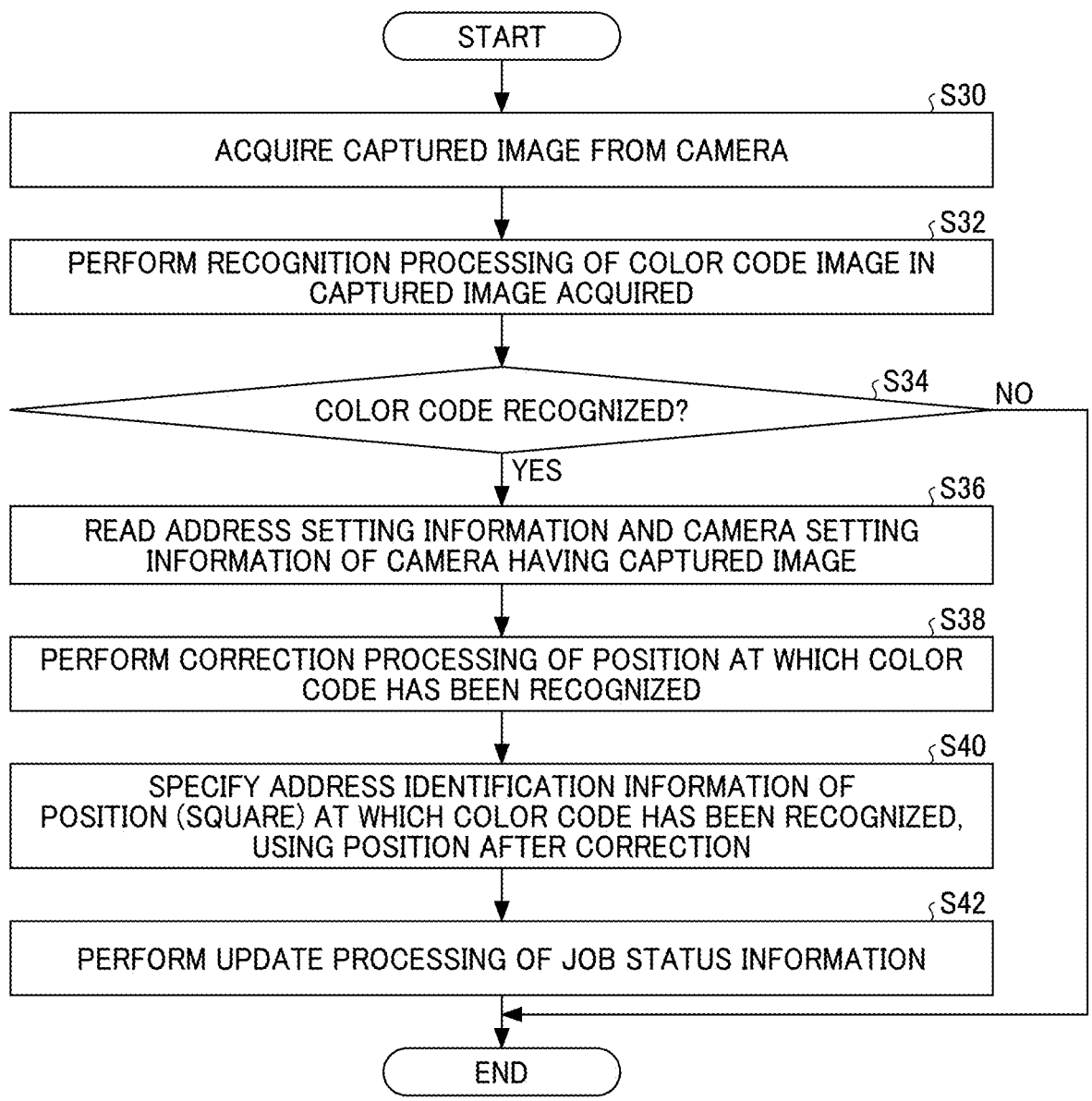
FIG. 13 is a flowchart illustrating an example of a management process of an information processing system according to an embodiment of the present disclosure.

In the job management system 1 according to the present embodiment, the job status of the job status information stored in the job management table storage unit 54 is updated by the processing illustrated in FIG. 13 when the work instruction form to which the color code image is added is captured by the cameras 18.

FIG. 13 is a flowchart illustrating an example of a management process of the information processing system according to the present an embodiment. In step S30, the captured image acquisition unit 44 of the work process management system 14 acquires a captured image from the camera 18.

In step S32, the color code recognition unit 46 performs recognition processing of a color code image from the captured image acquired by the captured image acquisition unit 44 in accordance with a procedure described in, for example, Japanese Unexamined Patent Application Publication No. 2017-199306 and Japanese Unexamined Patent Application Publication No. 2020-024658 or U.S. Patent Application Publication No. 2020-034592 which is incorporated by reference herein. When recognizing the color code image in step S34, the color code recognition unit 46 determines that the color code image is included in the captured image, and decodes the color code ID encoded in the color code image.

When the color code recognition unit 46 determines that a color code image is included in the captured image, processing of steps S36 to S42 is executed. If the color code recognition unit 46 does not determine that a color code image is included in the captured image, the processing of steps S36 to S42 is skipped. When determining that a color code image is included in the captured image, the color code recognition unit 46 provides, for example, camera identification information for identifying the camera 18 that has captured the color code image, the decoded color code ID, and the captured image from which the color code image has been recognized, to the correction processing unit 48.

In step S36, the correction processing unit 48 reads the address setting information and the camera setting information of the camera 18 that has captured the color code image, from the setting information storage unit 50. In step S38, the correction processing unit 48 calculates spatial coordinates of the color code image using the method illustrated in FIG. 6, and corrects the plane coordinates of the color code image using the spatial coordinates.

The correction processing unit 48 provides the management unit 36 with camera identification information for identifying the camera 18 that has captured the color code image, the decoded color code ID, the captured image from which the color code image has been recognized, and plane coordinate information of the corrected color code image.

In step S40, the management unit 36 reads the address setting information of the camera 18 that has captured the color code image, from the setting information storage unit 50. The management unit 36 specifies the address identification information of the position (square) in the captured image at which the color code image is recognized using the plane coordinates of the corrected color code image. In step S42, the management unit 36 updates, for example, the job status information as illustrated in FIG. 14 using the specified address identification information and job process information.

FIG. 14 is a diagram illustrating an example of the configuration of job status information according to the present embodiment. The job status information illustrated in FIG. 14 manages address identification information, job process information, and status in association with each other. The job of the work instruction form in which the color code image is recognized in the step S32 is managed, using the job status information, as being in the position (squares) of the address identification information and the work process of the job process information that are associated with the position in the captured image in which the color code image has been recognized.

The correction process of the position where the color code image in the step S38 is recognized is executed by, for example, the process illustrated in FIG. 15. FIG. 15 is a flowchart illustrating an example of a correction process of a position where a color code is recognized, according to the present embodiment.

In step S50, as described with reference to FIG. 6, the position information generation unit 60 of the correction processing unit 48 calculates spatial coordinates of the recognized color code image based on the plane position of the color code image recognized from the captured image, the size of the recognized color code image, and the size of the reference code image.

In step S52, the plane coordinate information correction unit 62 corrects the plane coordinates of the color code image recognized from the captured image to a correct position as illustrated in FIGS. 6A to 6C by using the calculated spatial coordinates of the color code image. The correction processing unit 48 repeats the processing of steps S50 to S54 until the processing on all the color code images recognized from the captured image is completed.

In the correction process of the position where the color code image of the step S38 is recognized, the size of the reference code image on the reference plane is calculated as illustrated in FIG. 16 from the size of the reference code image captured in the captured image. The captured image is obtained by capturing the reference code image placed at the center of the reference plane with the camera 18.

FIG. 16 is a diagram illustrating an example of a method of calculating the size of a color code in a reference plane from the size of the color code placed at the center of the reference plane. FIG. 16 illustrates the relationship between the size S' of the reference code image at the center of the reference plane, the height H' of the camera 18 from the reference plane, and the size $S_1$ of another reference code image in the reference plane.

The relations illustrated in FIG. 16 can be expressed by the following expressions (5) and (6).

$$H_1 = (X_1^2 + H'^2)^{1/2} \quad (5)$$

$$1/S':1/S_1 = H'^2:H_1^2 \quad (6)$$

Expression (7) for calculating the size $S_1$ of another reference code image in the reference plane can be obtained from the above expressions (5) and (6).

$$S_1 = H'^2/H_1^2 S' = H'^2(X_1^2 + H'^2) \times S' \quad (7)$$

As illustrated in FIG. 16, if the size S' of the reference code image at the center of the reference plane is known, the size $S_1$ of another reference code image in the reference plane can be calculated.

The update processing of the job status information in step S42 is executed by, for example, the process illustrated in FIG. 17. FIG. 17 is a flowchart illustrating an example of the update processing of the job status information in the job management system according to the present embodiment.

In step S60, the management unit 36 refers to the color code management table stored in the color-code management table storage unit 52 and specifies the job ID corresponding to the color code ID of the color code image recognized. In step S62, the management unit 36 updates the job status information of FIG. 14 so as to store the address identification information and the job process of the position (square) where the color code image is recognized, which is specified from the position of the plane coordinates of the corrected color code image, in association with the job ID specified in step S60. The management unit 36 repeats the processing of steps S60 to S64 until the processing on all the color code images recognized from the captured image is completed.

Further, the job management system 1 according to the present embodiment can provide the user with the contents of the work processes of the job managed by grasping the position of the color code image, for example, by the procedure illustrated in FIG. 18. FIG. 18 is a flowchart illustrating an example of a map display process of the job management system according to the present embodiment.

In step S100, the UI unit 30 displays a map image, for example, by receiving a display operation of the map image from the user. The map image is a map image of a printing factory or the like including a range in which the position of an object to be managed is managed, and is a map image designated in the preparation process.

In step S102, the UI unit 30 receives an input operation of a job ID of an object to be managed whose position is to be searched for from the user. In step S104, the management unit 36 searches the job status information as illustrated in FIG. 14, and specifies the address identification information and the job process information of the position where the object to be managed corresponding to the input job ID is present.

Figure 19:
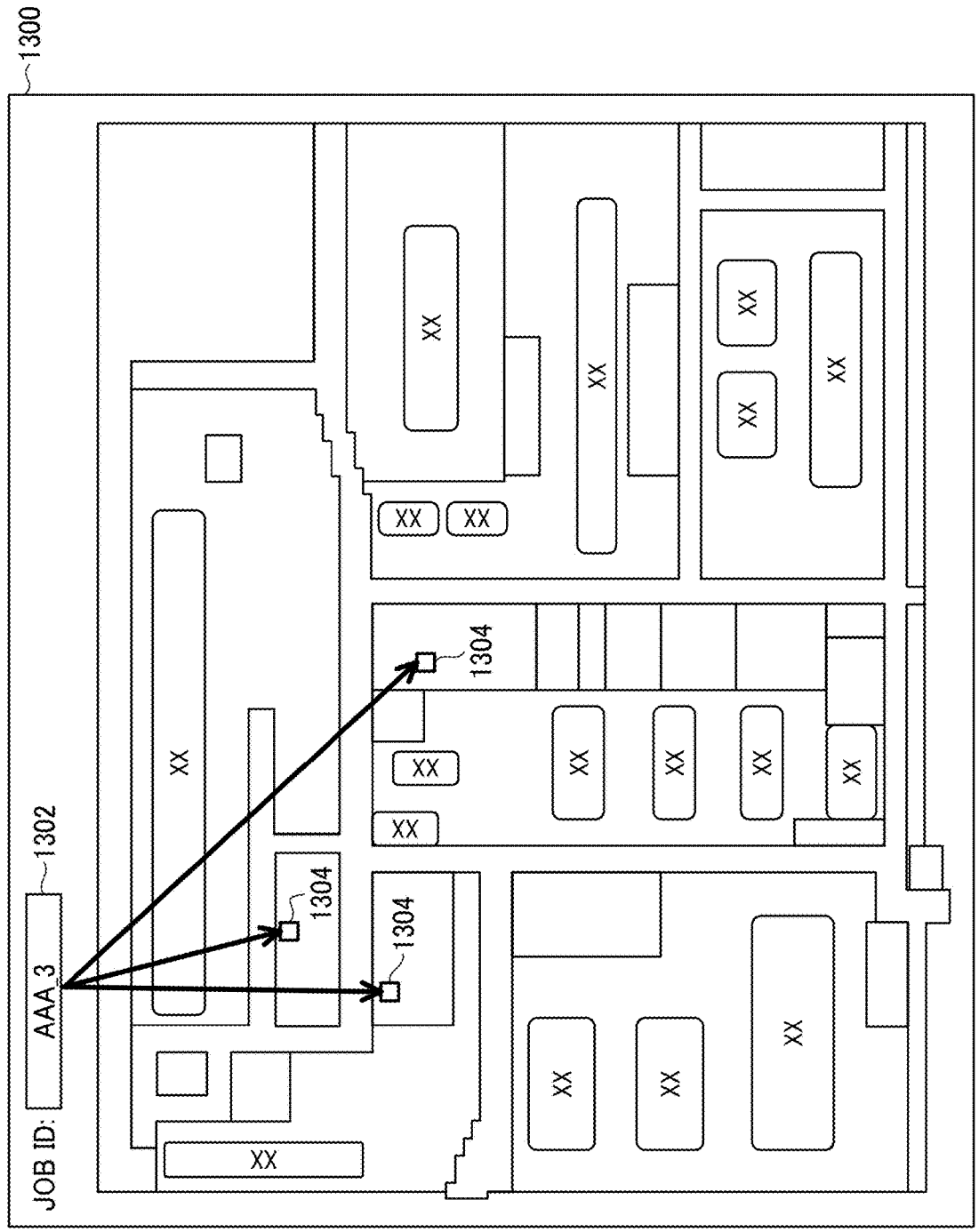
FIG. 19 is an image diagram illustrating an example of a map screen of a job management system according to an embodiment of the present disclosure.

In step S106, the management unit 36 displays the location of the object to be managed corresponding to the job ID with a marker 1304 as illustrated in FIG. 19, for example, in accordance with the address identification information and the job process information of the position where the object to be managed is present, which is specified in step S104. FIG. 19 is an image diagram illustrating an example of a map screen of the job management system according to the present embodiment. A map screen 1300 of FIG. 19 has a job ID input field 1302.

In the map screen 1300 of FIG. 19, the location of the job retrieved by the job ID is visually displayed on the map image by markers 1304. Note that the map screen 1300 may not only display the current location of the job retrieved by the job ID with the markers 1304, but also visually display the locus of movement. As described above, on the map screen 1300 of FIG. 19, the user can check the status of the object to be managed to which the work instruction form is attached and can track the object to be managed.

Figure 20:
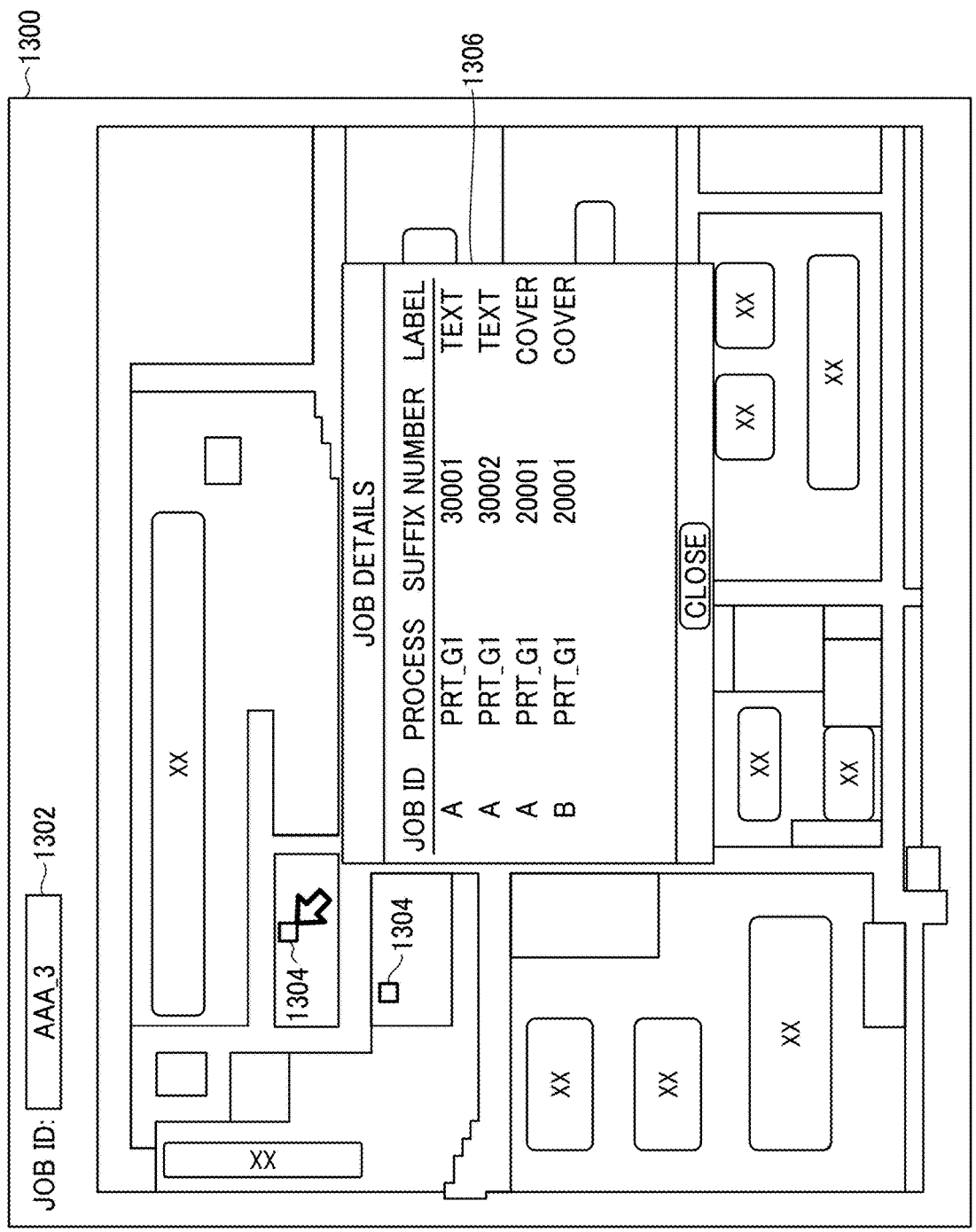
FIG. 20 is an image diagram illustrating an example of another map screen of a job management system according to an embodiment of the present disclosure.

When a plurality of color code images are recognized from the same square, job information 1306 of a plurality of jobs may be displayed as illustrated in FIG. 20 by, for example, mouse-over or clicking a marker 1304. FIG. 20 is an image diagram illustrating an example of another map screen of the job management system according to the present embodiment.

When a plurality of color code images are recognized from the same square, job information 1306 of a plurality of jobs may be displayed as illustrated in FIG. 21 by, for example, mouse-over or clicking a marker 1308. FIG. 21 is an image diagram illustrating an example of another map screen of the job management system according to the present embodiment. The marker 1308 in FIG. 21 has a shape indicating that a plurality of jobs are present in the same square. Note that the marker 1308 may be displayed in the same color as the color of the color-code-added d work instruction form, the border color, or the like.

Second Embodiment

In the first embodiment described above, a camera installation method in which the camera 18 is installed on a ceiling or the like and a range in which the position of an object is managed is captured from above is an example of upper installation. In a second embodiment of the present disclosure, a camera 18 is installed on a wall or the like, and a camera installation method for capturing a range in which the position of an object is managed from a lateral direction is an example of lateral installation.

Recognition of Position of Color Code Image

First, a description is given of an example in which the plane position of a color code image cannot be correctly recognized when the position of the color code image is recognized from a captured image captured by the camera 18 of the lateral installation. FIGS. 22A and 22B are diagrams illustrating an example of a case where the position of a color code cannot be correctly recognized.

In FIG. 22A, a color code image (1) and a color code image (2) are present at different heights in the same plane position. In FIG. 22B, the color code image (1) and a color code image (3) are present at different plane positions with different heights. Although FIG. 22B illustrates both the color code images (1) and (3) at the same time for ease of comparison, the color code images (I) and (3) are not present at the same time, but one of the color code images (1) and (3) is present.

As illustrated in FIG. 22A, in a case where the color code images (1) and (2) are not present on a straight line in the image capturing direction even when the color code images (1) and (2) are present at the same plane position, the camera 18 would produce a captured image as if the color code images (1) and (2) are present at different plane positions. Accordingly, in the example of FIG. 22A, when the plane positions of the color code images (1) and (2) are detected from the captured image, it would be recognized that the color code images (1) and (2) at the same plane position are present at different plane positions.

As illustrated in FIG. 22A, in a case where the color code images (1) and (3) are present on a straight line in the image capturing direction even when the color code images (1) and (3) are present at different plane positions, the camera 18 would produce a captured image as if the color code images (1) and (3) are present at the same plane position. Accordingly, in the example of FIG. 22B, when the plane positions of the color code images (1) and (3) are detected from the captured image, it would be recognized that the color code images (1) and (3) at different positions are present at the same plane position.

Figure 23:
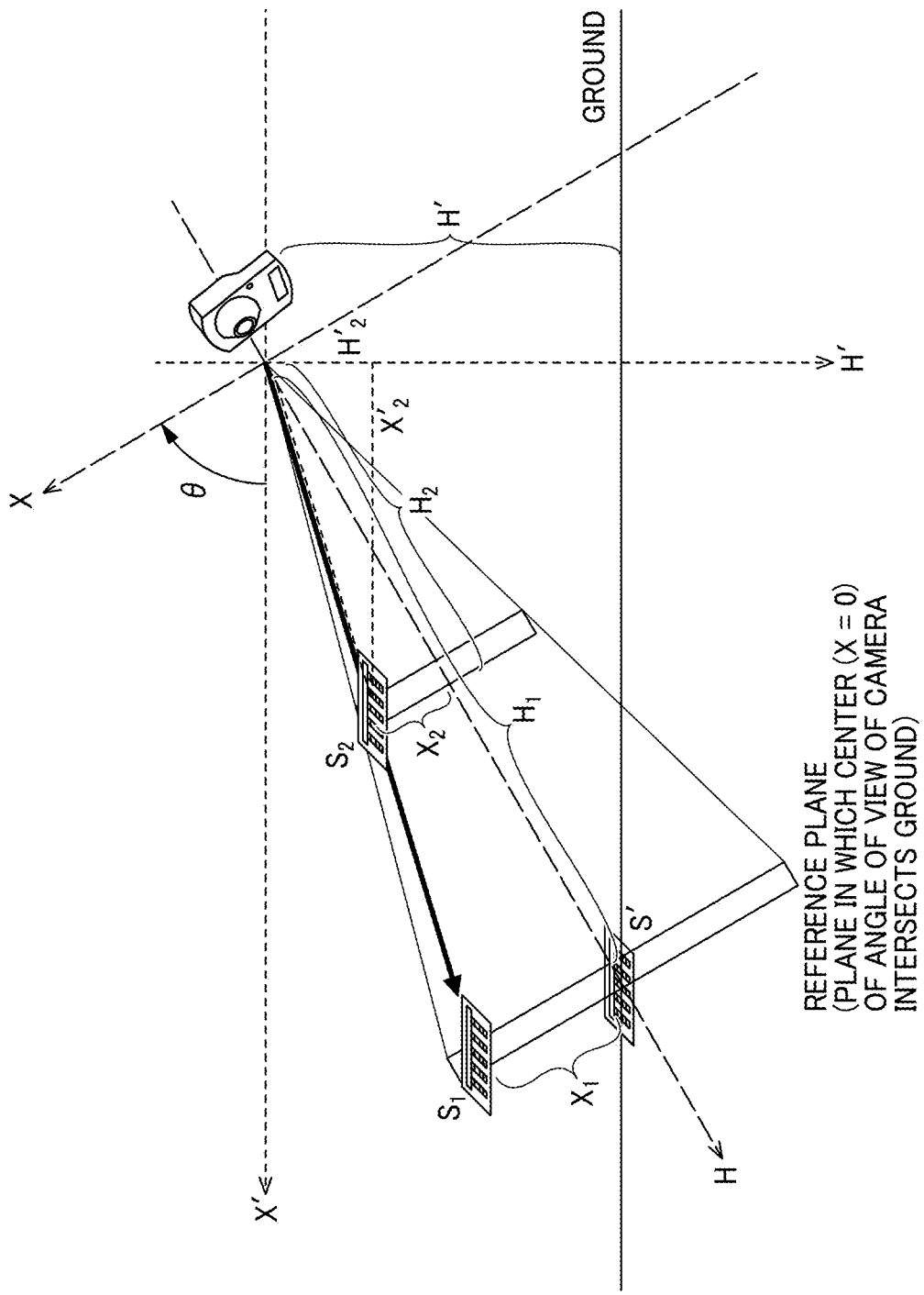
FIG. 23 is a diagram illustrating an example of a method for correctly recognizing the position of a color code.

For this reason, in the present embodiment, the plane position of the color code image is accurately detected by the method illustrated in FIG. 23. FIG. 23 is a diagram illustrating an example of a method for correctly recognizing the position of a color code. In the method illustrated in FIG. 23, the plane position of the color code image is detected in the same manner as in the method illustrated in FIG. 6 by projecting the plane position obtained from the captured image onto the real space.

In FIG. 23, a plane in which the center (X=0) of the angle of view of the camera 18 intersects the ground is illustrated as a reference plane. From the height H' of the camera 18 from the ground and the inclination θ of the camera 18, the distance $H_1$ from the camera 18 to the reference plane can be expressed by the following expression (8).

$$H_1 = H'/\cos\theta \tag{8}$$

In FIG. 23, based on the plane position $X_1$ of the reference plane of the color code image recognized from the captured image and the reference code size S' of the reference plane, the reference code size $S_1$ of the reference plane is calculated from the following expression (9).

$$1/S' : 1/S_1 = H_1^2 : (H_1^2 + X_1^2) \tag{9}$$

The detection values $X_2$ and $H_2$ are calculated using the method of the first embodiment, based on the size $S_2$ of the color code image of the captured image, the reference code size $S_1$, and the plane position $X_1$ of the reference plane of the color code image recognized from the captured image. The plane position $X'_2$ of the color code image and the height $H'_2$ of the camera 18 can be calculated by converting the calculated detection values $X_2$ and $H_2$ into X' H' coordinates by the following expressions (10) and (11).

$$H'_2 = (X_2^2 + H_2^2)^{1/2} \times \cos(\theta + \tan^{-1}(X_2/H_2)) \tag{10}$$

$$X'_2 = ((X_2^2 + H_2^2) - H'^2_2)^{1/2} \tag{11}$$

Since the Y-axis direction is rotated around the Y-axis, coordinate conversion is not necessary. For example, in the example of FIG. 23, when the height H' of the camera 18 from the ground is 4 m and the inclination θ of the camera 18 is 60°, the distance $H_1$ from the camera 18 to the reference plane can be calculated as follows.

$$H_1 = H'/\cos\theta$$
$$= 4/0.5$$
$$= 8 \text{ m}$$

Assuming that the size $S_2$ of the color code image of the captured image is 400, the plane position $X_1$ of the reference plane of the color code image is 2 m, and the reference code size S' at the plane position $X_1$ of the reference plane is 100, the detection values $X_2$ and $H_2$ can be calculated as follows.

$$X_2 = (S_1/S_2)^{1/2} \times X_1$$
$$= (100/400)^{1/2} \times 2$$
$$= 1 \text{ m} \quad H_2 = (S_1/S_2)^{1/2} \times H_1$$
$$= (100/400)^{1/2} \times 8$$
$$= 4 \text{ m}$$

The plane position $X'_2$ of the color code image and the height $H'_2$ of the camera 18 can be calculated as follow by converting the calculated detection values $X_2=1$ m and $H_{2=4}$ m into X' H' coordinates.

$$H'_2 = (X_2^2 + H_2^2)^{1/2} \times \cos(\theta + \tan^{-1}(X_2/H_2))$$
$$= (1^2 + 4^2)^{1/2} \times \cos(60° + \tan^{-1}(1/4))$$
$$\approx 1.13 \text{ m}$$

$$X'_2 = ((X_2^2 + H_2^2) - H'^2_2)^{1/2}$$
$$= ((1^2 + 4^2) - 1.13^2)^{1/2}$$
$$\approx 3.96 \text{ m}$$

FIG. 24 illustrates the camera setting information used in the second embodiment. FIG. 24 is a diagram illustrating an example of the configuration of camera setting information according to the present embodiment. In the camera setting information of FIG. 24, "camera inclination θ" is added as an item to the camera setting information of FIG. 12. The item "camera inclination θ" is an example of information indicating the inclination of the installed camera 18.

Figure 25:
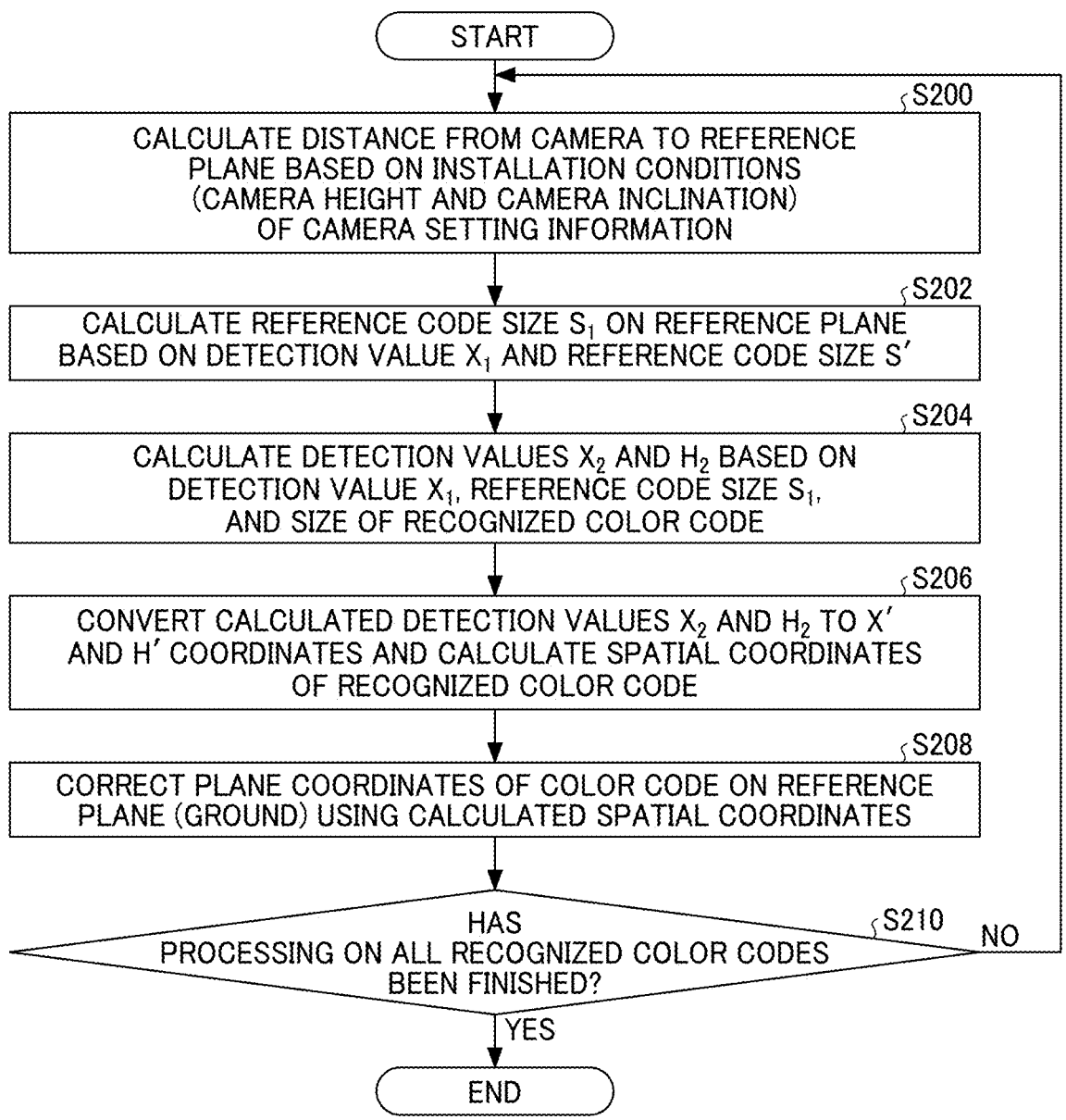
FIG. 25 is a flowchart illustrating an example of a correction process of a position where a color code is recognized, according to an embodiment of the present disclosure.

Further, in the second embodiment, the correction process of the position where the color code image in the step S38 is recognized is executed by, for example, the process illustrated in FIG. 25. FIG. 25 is a flowchart illustrating an example of a correction process of a position where a color code is recognized, according to the present embodiment.

In step S200, as described with reference to FIG. 23, the position information generation unit 60 of the correction processing unit 48 calculates the distance $H_1$ from the camera 18 to the reference plane based on the installation conditions (camera height and camera inclination) of the camera setting information.

In step S202, the position information generation unit 60 calculates the reference code size S' of the reference plane, based on the plane position $X_1$ of the reference plane of the color code image recognized from the captured image and the reference code size $S_1$ of the reference plane.

In step S204, the position information generation unit 60 calculates the detection values $X_2$ and $H_2$ using the method of the first embodiment, based on the size $S_2$ of the color code image of the captured image, the reference code size $S_1$, and the plane position $X_1$ of the reference plane of the color code image recognized from the captured image.

In step S206, the position information generation unit 60 can calculate the plane position $X'_2$ of the color code image and the height of the camera 18 by converting the calculated detection values $X_2$ and $H_2$ into X' H' coordinates.

In step S208, the plane coordinate information correction unit 62 corrects the plane coordinates of the color code image recognized from the captured image to a correct position as illustrated in FIG. 23 by using the spatial coordinates of the color code image calculated in step S206. The correction processing unit 48 repeats the processing of steps S200 to S210 until the processing on all the color code images recognized from the captured image is completed.

According to the second embodiment, the positions of color code images that are superimposed at the same position and are present at different height positions can be correctly recognized. For example, on the map screen 1300 of FIG. 21, a plurality of color code images of the object to be managed superimposed at the same position can be displayed in a superimposed manner or in a shaded manner.

Third Embodiment

The first embodiment and the second embodiment described above can be used in combination. In the third embodiment, since a camera installation method is set for each camera 18, camera setting information as illustrated in FIG. 26 is used. FIG. 26 is a diagram illustrating an example of the configuration of camera setting information according to the present, embodiment. In the camera setting information of FIG. 26, "camera installation method" is added as an item to the camera setting information of FIG. 24. The item "camera installation method" is an example of information indicating, whether the installed camera 18 is in the upper installation or the lateral installation. Note that the camera installation method may be automatically determined from the value of the camera inclination θ.

Further, in the third embodiment, the correction process of the position where the color code image in the step S38 is recognized is executed by, for example, the process illustrated in FIG. 27. FIG. 27 is a flowchart illustrating an example of a correction process of a position where a color code is recognized, according to the present embodiment.

In step S300, the position information generation unit 60 of the correction processing unit 48 determines whether the camera 18 that has captured a captured image is in the upper installation from the installation conditions (camera installation method) of the camera setting information in FIG. 26.

If the camera 18 is an upper installation camera, the position information generation unit 60 performs a position correction process (correction process of the first embodiment) for the upper installation camera in step S304. If the camera 18 is not the upper installation camera 18, the position information generation unit 60 performs a position correction process (correction process of the second embodiment) for the lateral installation camera in step S306.

According to the third embodiment, the upper installation camera 18 and the lateral installation camera 18 can be used in combination, and various places can be dealt with.

Fourth Embodiment

The above-described first to third are technologies achieved by a work instruction form to which a code image to be attached to an object to be managed such as a printed matter is added. The technologies can be applied to a technology of a transport system represented by, for example, an automated guided vehicle (AGV).

For example, in a transport system that transports an article, a work instruction form to which a color code image is added is attached to the article, and the article being transported is captured by cameras 18, whereby the work process of the article being transported can be managed by a transport device. In addition, since the position of the transport device that is transporting the article and the transport destination of the article can be specified, the transport system can also control the movement of the transport device that transports the article.

Fifth Embodiment

Although the above-described first to fourth embodiments have been described as being applied to technologies of management of work processes of a job in a printing factory and a transport system, embodiments of the present disclosure can also be applied to, for example, management of work processes of articles flowing on a belt conveyor. If the technology of the present embodiment is provided for managing work processes of articles flowing on a belt conveyor, the articles flowing on the belt conveyor can be tracked, and branching of the belt conveyor can also be controlled.

Embodiments of the present disclosure are not limited to the embodiments specifically disclosed above, and various modifications and changes can be made without departing from the above-described teachings. The work process management system 14 is an example of an information processing apparatus according to an embodiment of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing system comprising:
an image capturer installed to capture an image of a range in which a position of an object to be managed is managed;
an information processing circuitry to recognize a code image corresponding to the object from a captured image captured by the image capturer and manage the position of the object;
processing circuitry configured to:
generate spatial coordinate information of the code image based on a position of the code image recognized from the captured image, a size of the code image recognized from the captured image, and a size of a reference code image; and manage the position of the object corresponding to the code image, with plane coordinate information of the code image corrected using the spatial coordinate information of the code image, wherein the processing circuitry is configured to display the object corresponding to code images of different sizes captured so as to be present at a same position in the captured image such that the code images of different sizes are present at different plane coordinates, based on plane coordinate information of the code images corrected using spatial coordinate information of the code images generated by the processing circuitry; and in response to reception of a search request for the object to be managed from a user, the processing circuitry is configured to display a position of the object on an image of the range in which the position of the object is managed, based on plane coordinate information of the code image corrected using the spatial coordinate information of the code image.

2. The information processing system according to claim 1,
wherein the processing circuitry is configured to generate the spatial coordinate information of the code image, based on a ratio of the size of the code image recognized from the captured image to the size of the reference code image, such that spatial coordinates of the code image recognized from the captured image are located between the position of the code image recognized from the captured image and the image capturer.

3. The information processing system according to claim 1,
wherein the processing circuitry is configured to display the object corresponding to code images captured so as to be present at different positions in the captured image such that the code images are present at the same plane coordinates, based on plane coordinate information of the code images corrected using spatial coordinate information of the code images generated by the processing circuitry.

4. The information processing system according to claim 1,
wherein the range in which the position of the object is managed is associated with a job process for the object, and
wherein when the plane coordinate information of the code image corrected using the space coordinate information of the code image indicates a position within the range in which the position of the object is managed, the processing circuitry is configured to display status information of the job process indicating that the object corresponding to the code image is present in the job process associated with the range.

5. The information processing system according to claim 1,
wherein the processing circuitry is configured to calculate the size of the reference code image for each position of a reference plane on which the code image is recognized, from the size of the code image placed at a center of the reference plane in the captured image captured by the image capturer.

6. A position management method, comprising:
generating spatial coordinate information of a code image corresponding to an object from a captured image based on a position of the code image recognized from the captured image, a size of the code image recognized from the captured image, and a size of a reference code image;
managing a position of the object corresponding to the code image, with plane coordinate information of the code image corrected using the spatial coordinate information of the code image;
displaying the object corresponding to code images of different sizes captured so as to be present at a same position in the captured image such that the code images of different sizes are present at different plane coordinates, based on plane coordinate information of the code images corrected using spatial coordinate information of the code images generated; and
in response to reception of a search request for the object to be managed from a user, displaying a position of the object on an image of a range in which the position of the object is managed, based on plane coordinate information of the code image corrected using the spatial coordinate information of the code image.

7. A non-transitory recording medium storing a plurality of instructions which, when executed by one or more processors, cause the processors to perform the position management method of claim 6.

8. An information processing apparatus configured to recognize a code image corresponding to an object to be managed, from a captured image captured by an image capturer installed to capture an image of a range in which a position of the object is managed, to manage the position of the object, the information processing apparatus comprising processing circuitry configure to:
generate spatial coordinate information of the code image based on a position of the code image recognized from the captured image, a size of the code image recognized from the captured image, and a size of a reference code image;
manage the position of the object corresponding to the code image, with plane coordinate information of the code image corrected using the spatial coordinate information of the code image;
display the object corresponding to code images of different sizes captured so as to be present at a same position in the captured image such that the code images of different sizes are present at different plane coordinates, based on plane coordinate information of the code images corrected using spatial coordinate information of the code images generated; and
in response to reception of a search request for the object to be managed from a user, display a position of the object on an image of the range in which the position of the object is managed, based on plane coordinate information of the code image corrected using the spatial coordinate information of the code image.

* * * * *